United States Patent
Di Costanzo et al.

(10) Patent No.: US 9,998,203 B2
(45) Date of Patent: Jun. 12, 2018

(54) AIRPLANE-TO-GROUND COMMUNICATION

(71) Applicant: Amadeus S.A.S., Biot (FR)

(72) Inventors: Pierre-Philippe Di Costanzo, Vallauris (FR); Thomas Gualino, Hammersmith (GB); Antoine Picolet, London (GB); Akshit Singla, Haryana (IN); Etienne Callies, Chaville (FR); Emile Generat, London (GB); David Triscornia, London (GB); Vincent Domurado, London (GB)

(73) Assignee: AMADEUS S.A.S., Biot (FR)

( * ) Notice: Subject to any disclaimer, the term of this patent is extended or adjusted under 35 U.S.C. 154(b) by 182 days.

(21) Appl. No.: 14/727,150

(22) Filed: Jun. 1, 2015

(65) Prior Publication Data

US 2016/0352412 A1    Dec. 1, 2016

(30) Foreign Application Priority Data

May 29, 2015   (EP) .................................... 15290143

(51) Int. Cl.
   *H04B 7/185*   (2006.01)
   *G06F 9/445*   (2018.01)
   (Continued)

(52) U.S. Cl.
   CPC .......... *H04B 7/18506* (2013.01); *G06F 8/61* (2013.01); *G06F 8/65* (2013.01); *G06F 8/68* (2013.01); *G06F 9/4451* (2013.01); *H04B 7/18508* (2013.01); *H04L 67/12* (2013.01); *H04N 21/2146* (2013.01)

(58) Field of Classification Search
   None
   See application file for complete search history.

(56) References Cited

U.S. PATENT DOCUMENTS 7,802,724 B1 *  9/2010  Nohr .................. G07C 9/00111
                                                 235/384
8,170,535 B1 *  5/2012  Lopes ................ H04N 21/2146
                                                 455/414.1

(Continued)

OTHER PUBLICATIONS

European Patent Office, Search Report issued in corresponding Application No. 15290143.5, dated Nov. 4, 2015, 7 pages.

*Primary Examiner* — Mohammad Anwar
*Assistant Examiner* — Angel Brockman
(74) *Attorney, Agent, or Firm* — Thompson Hine LLP

(57) ABSTRACT

Onboard servers, and methods for communicating over wireless interface between an onboard server installed in an airplane and a ground server located remote from the airplane. Executable application code and first user data is received by the onboard server from the ground server before take-off of the airplane and stored. At least a part of the executable application code is executed by the onboard server. The onboard server receives delta user data from the ground server after the take-off and before landing of the airplane. The first delta user data updates the first user data to form second user data. The onboard server, after takeoff and before landing of the airplane, transmits at least a portion of the second user data to a seat entertainment terminal mounted within the airplane and/or to a personal mobile terminal of a user aboard the airplane for presentation to the user.

23 Claims, 17 Drawing Sheets

(51) Int. Cl.
 G06F 9/44 (2018.01)
 H04N 21/214 (2011.01)
 H04L 29/08 (2006.01)

(56) References Cited

U.S. PATENT DOCUMENTS

| | | | |
|---|---|---|---|
| 9,424,723 B2 * | 8/2016 | Dubarry | G08B 13/2462 |
| 2006/0107295 A1 * | 5/2006 | Margis | H04N 7/163 |
| | | | 725/81 |
| 2009/0187640 A1 | 7/2009 | Delia | |
| 2011/0182230 A1 * | 7/2011 | Ohm | H04B 7/185 |
| | | | 370/315 |
| 2015/0349875 A1 * | 12/2015 | Lauer | H04B 7/18506 |
| | | | 370/316 |

* cited by examiner

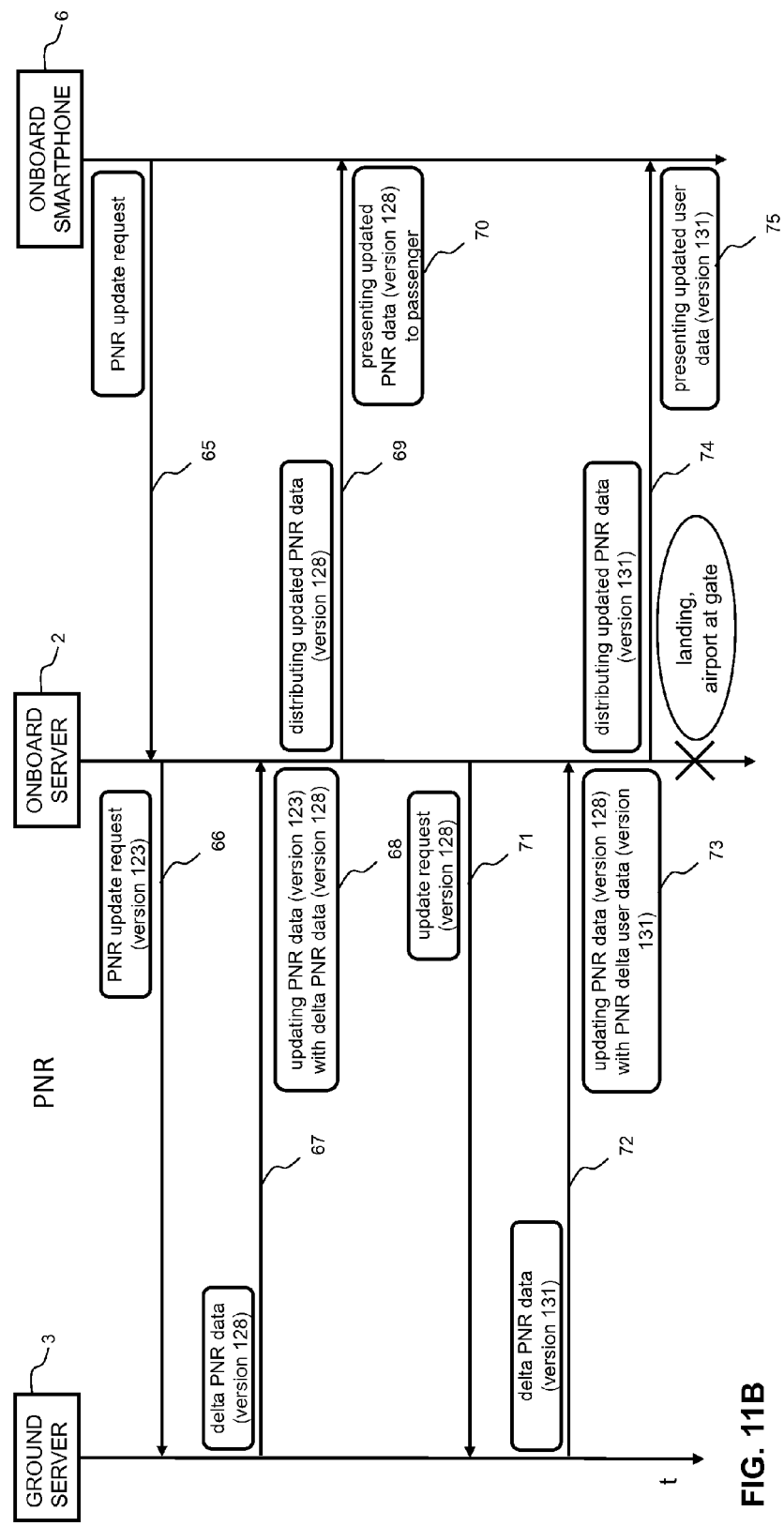

AIRPLANE-TO-GROUND COMMUNICATION

BACKGROUND

The present invention is directed to communication technologies including server, clients and data exchange via a wireless interface. More specifically, it is directed to a method, a server and a computer program for airplane-to-ground communication during a flight.

Due to the wide-spread employment of mobile communication devices such as smartphone and tablets for business and personal communication as well as increasing coverage of 3G and 4G as well as WiFi networks, information technology has become ubiquitous in today's world. People are used to and expect the possibility of permanent and continuous use of the mobile communication devices, irrespective from their current location and situation.

However, there are still technical and other constraints and limitation which are a bar to a ubiquitous usage of mobile communication devices, including lack of coverage or insufficient bandwidth in remote regions or special locations, large data volume e.g. for cloud applications in circumstances of small bandwidths or unstable connections and legal requirements prohibiting the activation of wireless connections. Hence, a need exists for technical solutions addressing those constrains and limitations in order to increase the utilization of mobile communication devices also in in such particular situations.

SUMMARY

The present application is directed to facilitate an improved usage of communication devices during flights, in particular to enable information retrieval with passengers' communication devices while the passengers are located in an airplane.

According to one aspect, a method for data communication of an onboard server being installed in an airplane is provided. The onboard server is coupled via a wireless interface to a ground server. The ground server is located remote from the airplane, for example in a computing center at the ground. The onboard server receives executable application code and user data from the ground server prior to take-off of the airplane, e.g. while still being located at the gate of the departure airport. The onboard server stores the user data and executes at least a portion of the application code. After take-off and before landing of the airplane, the onboard server receives delta user data from the ground server. The delta user data updates the user data received prior to take-off thereby forming updated user data. Still after takeoff and before landing of the airplane, the onboard server transmits at least a portion of the updated user data to at least one seat entertainment terminal mounted within the airplane and/or to at least one personal mobile terminal of a user aboard the airplane for presentation of the transmitted updated user data to the user.

According to another aspect, an onboard server is provided implementing a corresponding functionality.

According to still another aspect, a computer program is provided being configured for execution by an onboard server and causing the onboard server to implement a corresponding functionality.

BRIEF DESCRIPTION OF THE DRAWINGS

The subsequent description of embodiments is based on the accompanying set of figures in which similar reference numerals refer to similar elements and messages and in which:

FIGS. 11A and 11B relate to a particular example of the user data being PNR data;

DETAILED DESCRIPTION

Figure 1:
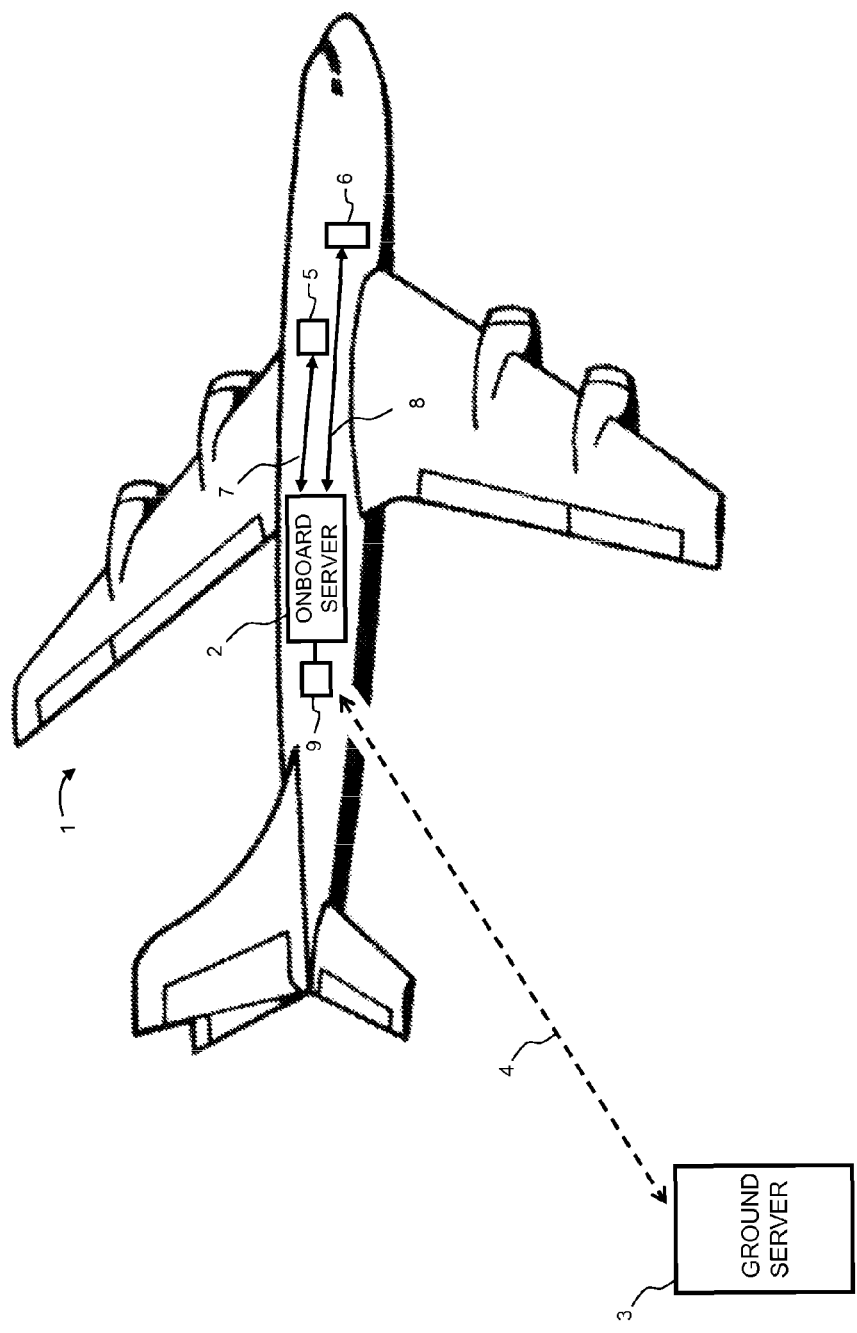
FIG. 1 shows a high-level schematic overview of the system architecture as described herein.
Figure 2:
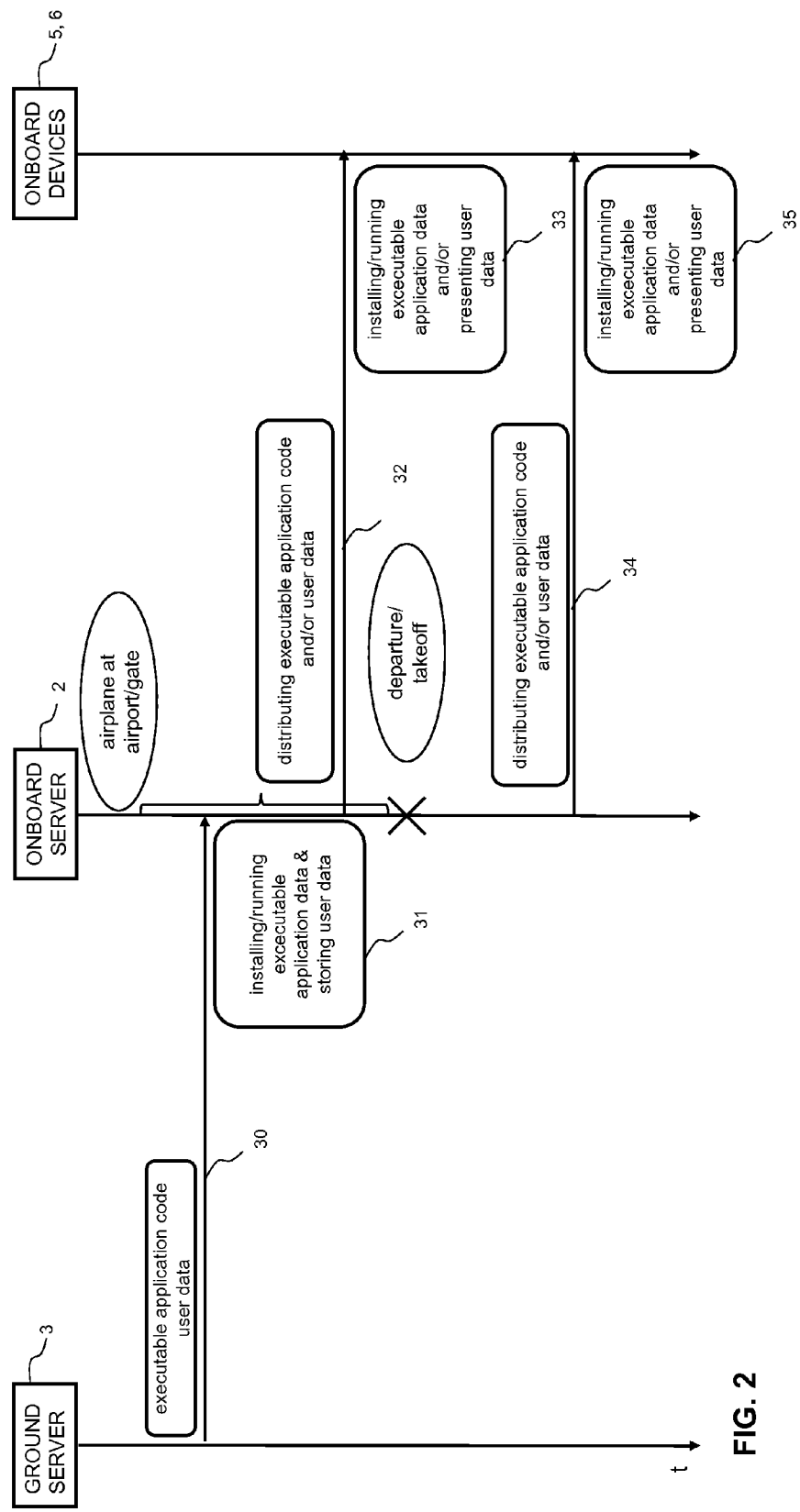
FIG. 2 shows a message sequence for providing code and data from the ground server via the onboard server to the onboard devices before and after takeoff.
Figure 3:
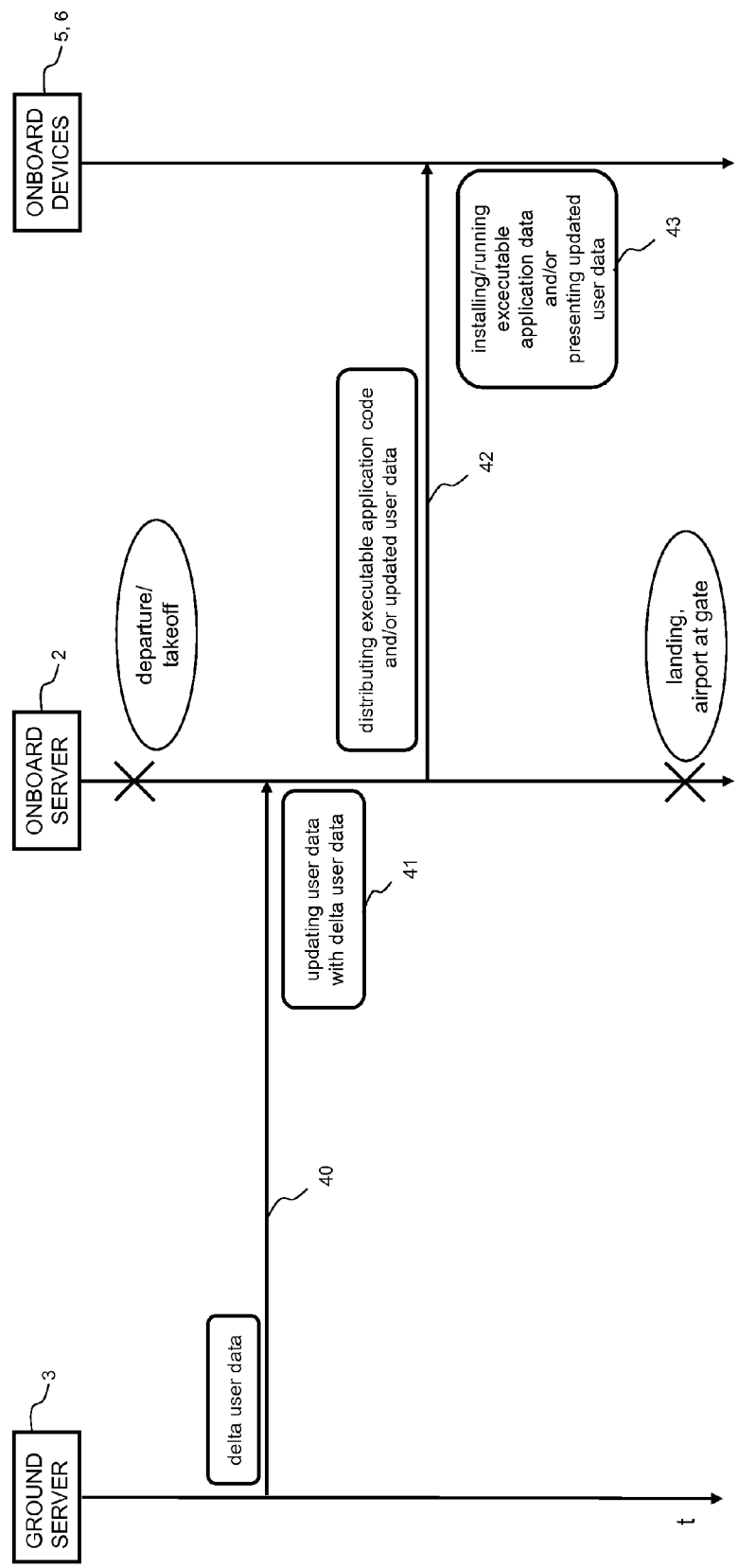
FIG. 3 shows a message sequence for providing delta data from the ground server via the onboard server to the onboard devices after takeoff.

Before turning to the description of the embodiments on the basis of FIG. 4 to 16, a few more general aspects are elaborated first with reference to FIG. 1 to 3.

The main elements implementing and participating the methodologies described herein are depicted by FIG. 1. To begin with, an onboard server 2 is installed in an airplane 1. The onboard server 2 is mounted within a suitable location of airplane 1. An implementation example of the onboard server 2 is given further below with reference to FIG. 16. The airplane 1 can generally be any kind of airplane having the purpose of transporting passengers including civil airplanes such as the Airbus A300 series (including the widely used models A319, A320, A321, A330 and newer types such as the A350 and A480) and the Boeing 7X7 series (including the widely used models such as the 737, 767 and 777 and newer types such as the 787), as well as models of other aircraft manufacturers including Bombardier and Embraer. In general, the onboard server 2 operates as an interworking or intermediate station managing the communication between terminals located in the airplane 1 and the ground.

The terminals located in the airplane 1 are hereinafter referred to as onboard devices. Different types of onboard devices may be present, including fixed seat entertainment terminals 5 mounted within the airplane seats and personal mobile terminals 6 which are either brought by passengers or the airplane crew or which are handed out by the airline operating the airplane's flight prior or during the flight. The personal mobile terminals 6 include devices such as smartphones, tablets, PDAs and laptops aboard the airplane. The onboard devices 5, 6 are in communication with onboard server 2. The communication between the onboard server and the onboard devices 5, 6 is either realized by wired connections 7 e.g. in the case of mounted seat entertainment terminals 5 or by a provision of network plugs at the seat for plugging personal mobile communication devices 6 to a wired onboard local area network and/or by wireless connections 6, e.g. via a GSM/3G/4G cellular network such as a picocell or femtocell network utilizing one or more onboard basestation(s), WiFi utilizing one or more WiFi access points installed within the aircraft and/or by Bluetooth. Thus, onboard server 2 and the onboard devices 5, 6 form a local network aboard the airplane 1.

The onboard server 2 is further communicatively coupled with a ground server 3 which is e.g. located in a computing center at an arbitrary location on the ground. The communication between the onboard server 2 and the ground server 3 utilizes a wireless interface 4. For example, a satellite communication module and/or 3G/4G/5G transceiver module 9 is mounted within the airplane to which the onboard server 2 is connected. The onboard server's connection to this communication module 9 is realized via a wired line or, alternatively, via a wireless connection, e.g. by WiFi. The communication module 9 can also be attached to or integrated into the onboard server 2. In the example of a satellite communication module, the communication module 9 communicates via satellite (utilizing a SatCom antenna installed at the airplane 1) via one or more landline-based networks (WAN, Internet) to the ground server 3. In the example of a 3G/4G/5G transceiver module, the communication module 9 communicates with a 3G/4G/5G mobile communication network on the ground which, in turn, connects the onboard server 2 through potentially further landline-based networks (WAN, Internet) to the ground server 3. The ground server 2 may either be a single server or be composed of a plurality of interconnected servers. The main functions of the ground server 2 are to provide the onboard server 2 with basic and updated user data and executable code (as will be explained in detail below), either by being the source of the user data and/or executable code and/or by operating as an interface to other servers and networks hosting the user data and/or the executable code.

Communication protocols used for transmitting data between onboard server 2 and ground server 3 include the respective protocol suite of the 3G/4G/5G network employed on the ground (e.g. MAC, LLC, RLC, PDPC and other protocol on the various lower layers), TCP/IP on the network layer and the transport layer as well as webservice protocols such as SOAP utilizing HTTP/HTTPS, SMTP, JMS as well as any other protocols located at the application layer. The data exchanged on the application layer is, for example, formatted in accordance with XML and or JSON (=JavaScript Object Notation).

By utilizing these basic components arranged in the architecture schematically depicted by FIG. 1, the following basic communication scheme is realized (FIGS. 2 & 3). Generally, two phases or situations of the airplane's communication with the ground server 3 can be distinguished, a ground phase and a flight phase. During the ground phase, i.e. when the airplane 1 is located on the ground, for example at a gate at the origin airport before departure, the architecture is used to initialize the onboard server 2 with basic data and software in order to provide the onboard devices 5, 6 with requested information. During the flight phase, i.e. when the airplane 1 is in the air, for example after takeoff from the origin airport and before landing at the destination during which onboard server 2 is provided with updates in order to update the basic data available at the onboard server 2 from the initialization during the ground phase.

During the ground phase (FIG. 2, visualized by the bracket denoted with "airplane at the airport/gate"), the onboard server 2 receives both, executable application code and user data, from the ground server 3 (message 30 in FIG. 2 which is meant to represent any type of message exchange during the ground phase in order to transmit executable application code and user data from the ground server 3 to the onboard server 2).

The term "executable application code" as used herein relates to two aspects, namely application code which is to be installed and to be executed at the onboard server 2, such as a. new server applications or updates of server applications e.g. implementing the communication functions of the onboard server 2 with the ground server 3 and the onboard devices 5, 6 and the provision of information services to the onboard devices 5, 6 described herein (see below); and b. other code implementing functions of the onboard server 2 including code relating to the onboard server's operating system (e.g. allowing OS updates) or security functions (such as virus scanner updates); and executable code which is to be forwarded by the onboard server 2 to requesting onboard devices 5, 6 and to be installed and executed at these onboard devices 5, 6, for example seat entertainment client software (or updates such client software), apps (or updates of such apps) to be installed on requesting personal communication devices 6 such as email clients, browsers, news apps, games, etc. Thus, in this respect, the onboard server 2 operates as an onboard app store for the onboard terminals 5, 6.

Note that the executable application code as used herein also includes static files used for execute applications such as configuration files.

The term "user data" as used herein relates to any type of electronic data (other than the executable code) which is intended to be distributed and to be made available to the onboard devices 5, 6 during the flight (and, of course, also already prior to takeoff and after landing, if requested). The user data includes, for example, entertainment data including films, pictures, news, personal passenger data e.g. information relating to the current flight, connecting flights, accommodations etc., personal data such as data kept in a private cloud, business-related data such as business news and stock exchange data, data related to the current flight status such as whether predictions and current weather information, data of prominent/frequently used websites and so on. Thus, in this regard, the onboard server 2 operates as an onboard data server for the onboard terminals 5, 6.

Thus, during the ground phase, the above architecture (FIG. 1), particularly the coupling with the ground server 3 via the wireless interface 4, enables providing as well as updating the onboard server 2 remotely with the basic executable code and the basic user data while airplane 1 is still on the ground 1. This is a significant improvement of flight entertainment servers previously implemented in airplanes which were only be arranged to be updated in a proprietary manner by IT service personal being physically aboard the airplane. By the present coupling of the onboard server 2 with the ground server 3, installations of new server applications, updates of server application, changing the configuration of server applications and the onboard server's 2 provision with new user data is made more flexible and can be performed more regularly with less manual effort. For example, a software update/reconfiguration and a data update to the onboard server 2 is made possible in rather short time intervals in which the airplane 1 is located on the ground between two subsequent flights.

Furthermore, the transmission of user data from the ground server 3 to the onboard server 2 prior to take-off makes possible to provide the onboard server 2 with the basic set of user data (particularly the current user data which is up-to-date at the time before the airplane 1 leaving the airport gate). This minimizes the need for updating the user data during the flight, while still allowing to provide the onboard devices 5, 6 with the most current user data during the flight. In other words, the main amount of user data can be transmitted to the onboard server 2 before the airplane's takeoff when the bandwidth of the wireless interface 4 between the onboard server 2 and the ground server 3 is generally of good quality e.g. due to the relatively constant mobile connection conditions, a short distance to the 3G/4G/5G infrastructure (eliminating the need to utilize expensive and low-bandwidth satellite connections), all of which e.g. renders it possible to provide a guaranteed and relatively high bandwidth (higher than during the flight) to the onboard server's 2 connection to the ground server 3.

As the executable application code is made available at the onboard server 2 during the ground phase, the onboard server 2 executes at least a part of the executable application code (box 31 in FIG. 2). For example, the application code implementing the onboard server's 2 communication functions, the code controlling the operation of the onboard server 2 (including the onboard server's operating system), and code implementing server applications such as an entertainment server, a passenger information server, and an app store server and/or updates to these programs may be transmitted to the onboard server 2 from the ground server 3 while the airplane 1 is located on the ground and these server applications and updates are subsequently installed at the onboard server 2 (installation may also be observed remotely or performed by prepared scripts). In some embodiments, the onboard server 2 executes this application code in form of the executed server applications 19 depicted by FIG. 16. Furthermore, the onboard server 2 stores the user data and the parts of the executable application code meant to be running on the onboard devices (such as client software and apps) received from the ground server 3 during the ground phase, e.g. in a repository which is, for example, implemented by a database (also depicted by box 31 of FIG. 2). In some embodiments, the onboard server 2 stores the user data related to particular server applications together with the executed server applications 19 (e.g. content of frequently used websites may be cached in module 19 to be made available to the onboard devices 5, 6 by a webserver hosted by the onboard server 2), entertainment content such as films, pictures, and music in entertainment content database 18 and executable application code meant to be running on the onboard devices 5, 6 in application storage database 21 (cf. FIG. 16).

Figure 16:
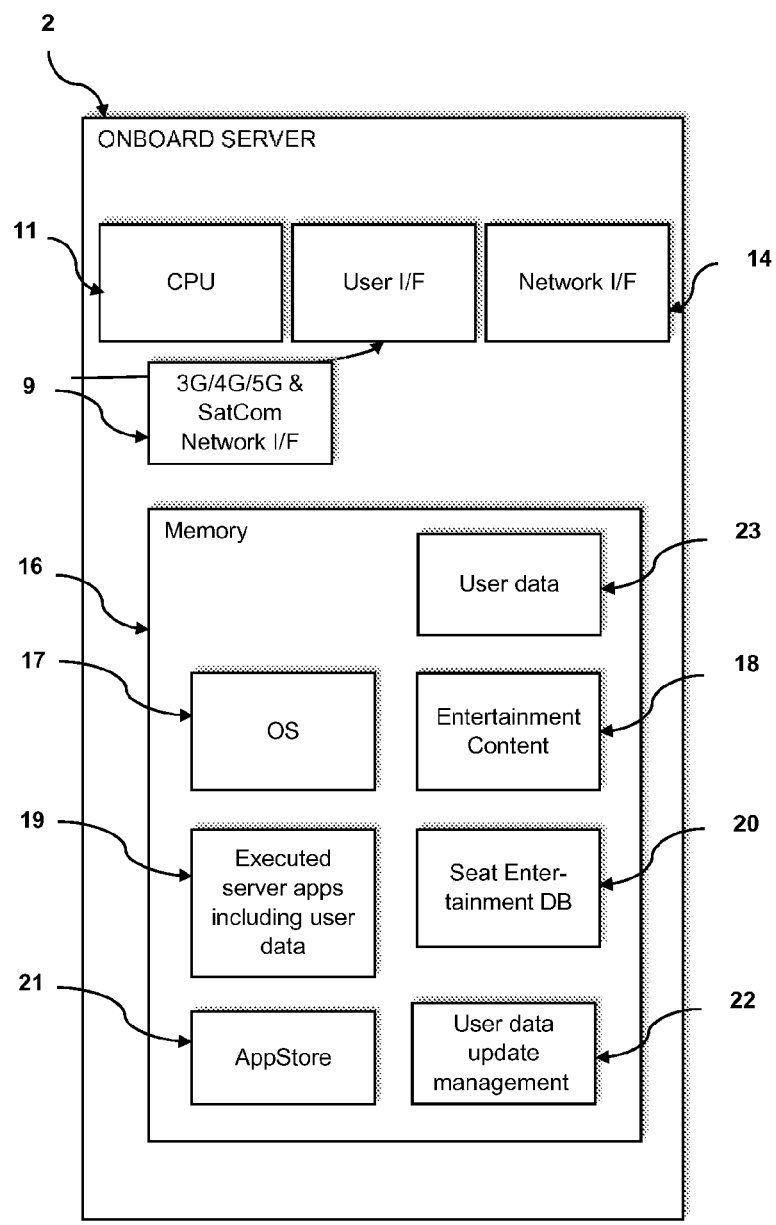
FIG. 16 depicts the main components of an onboard server implementation.

Still during the ground phase, the user data and/or executable application code intended to be installed and executed at the onboard devices 5, 6 can be made available by the onboard server 2 to the onboard devices 5, 6 (message 32 in FIG. 2 which is meant to represent any type of message exchange during the ground phase in order to distribute executable application code and/or user data from the onboard server 2 to any number of onboard devices 5, 6 requesting such information, including content retrieval requests by the onboard devices retrieving executable application code and/or user data from the onboard server 2). Thus, the onboard devices may already retrieve executable application code and/or user data from the onboard server 2 while the airplane 1 is still on the ground and e.g. the passengers wait for the start of the airplane 1. Hence, the application code retrieved from the onboard server 2 can already be executed by the onboard devices 5, 6 and the user data retrieved from the onboard server 2 can already be presented to the users while the airplane 1 is still on the ground (depicted by box 33 in FIG. 2). In order to distribute the executable application code and/or the updated user data, the onboard server 2 utilizes at least a part of the executed application code such as a server application streaming entertainment programs to the seat entertainment terminals 5 or a passenger information server providing current passenger information to the personal communication devices 6, for example the user data update management module 22 (FIG. 16).

The ground phase ends, at the latest, with the take-off of the airplane (indicated by the cross in FIG. 2). By that, the airplane 1 leaves the "safe harbor" (in terms of ground communication connectivity) at the airport, and the flight phase begins.

As visualized by message 34 and box 35 in FIG. 2, the same activities of distributing the executable application code and/or user data received by the onboard server 2 during the ground phase to the onboard devices 5, 6 and executing the application code and visualizing the user data at the onboard devices 5, 6 may also be performed during the flight phase (again, message 34 in FIG. 2 is meant to represent any type of message exchange during the flight phase in order to distribute the executable application code and/or user data received by the onboard server 2 during the ground phase from the onboard server 2 to any number of onboard devices 5, 6 requesting such information).

During the flight, the user data maintained by the onboard server 2 is updated. To this end, the onboard server 2 receives delta user data from the ground server 3 after take-off and before landing of the airplane 1 (message 40 in FIG. 3 which is meant to represent any type of message exchange during the flight phase in order to transmit delta user data from the ground server 3 to the onboard server 2). The term "delta user data" used herein is meant to express the fact that the data already available at the onboard server 2, in particular due to the onboard server's 2 provision with the basic executable application code and user data during the ground phase, is not again re-transmitted from the ground server 3 to the onboard server 2 during the flight phase. Thus, delta user data updates the user data already present at the onboard server 2, in particular the basic user data received during the ground phase (i.e. prior to take-off forming), and thus forms updated user data at the onboard server 2. For example, delta user data may include changed, more current and/or updated user data which was not yet available during the ground phase such as current weather information, stock exchange data, updated information regarding connecting flight or passenger accommodations, new email messages, updated news and so on.

In some embodiments, the onboard server 2 also receives delta executable application code from the ground server 3 during the flight phase forming updated application code at the onboard server and adding/changing the functionalities implemented by the executed application code at the onboard server 2 and/or the onboard devices 5, 6. For example, the ground server 3 may transmit a patch to the onboard server 2 during the flight phase, the installation of which at the onboard server 2 and/or the onboard devices 5, 6 eliminates a bug in and or adds a certain functionality to a server application or a client program.

In the same way as the onboard server 2 distributes executable application code and user data received in the ground phase before take-off, the onboard server 2 distributes the updated user data (and also potentially updated executable application code) to the onboard devices. Thus, as shown by message 42 in FIG. 3 (which is again meant to represent any type of message exchange during the flight phase in order to distribute the (updated) executable application code and/or updated user data from the onboard server 2 to any number of onboard devices 5, 6 requesting such information), the onboard server 2 transmits at least a portion of the updated user data to the onboard devices, more specifically to at least one of the one seat entertainment terminals 5 mounted within the airplane and/or to at least one the personal mobile terminals 6 of a user/passenger/crew member aboard the airplane for presentation of the transmitted updated user data to the user/passenger/crew member. Similar as already during the ground phase, in order to distribute the executable application code and/or the updated user data, the onboard server 2 utilizes at least a part of the executed application code also during the flight phase (i.e. after take-off and before landing), such as a server application streaming entertainment programs to the seat entertainment terminals 5 or a passenger information server providing current passenger information to the personal communication devices 6.

Similar to the activities depicted by boxes 33 and 35 in FIG. 2 and described already above, the onboard devices 5, 6 install and execute potentially updated application code received from the onboard server 2 during the flight phase and present potentially updated user data received from the onboard server during the flight phase to the user (box 43 in FIG. 3). The flight phase then ends with the landing of the airplane 1 at the destination airport and its arrival at the assigned gate.

Thus, overall, the basic communication scheme described above relies on the onboard server 2 as the central entity. The onboard devices 5, 6 do not communicate directly with the ground to retrieve current user data, but always retrieve current user data from the onboard server 2. The onboard server 2 manages the ground communication on behalf of all the onboard devices 5, 6 and is therefore able to efficiently make use of the limited bandwidth available for ground communication during the flight phase. In this way, the amount of data exchanged during the flight phase of the airplane 1 is minimized, while still the most current user data can be delivered to the onboard devices 5, 6. Further, as will also be explained further below, the onboard server 2 is able to provide user data as well as executable application code to the onboard devices 5, 6 even during times when no ground connection at all is available or ground connection is prohibited for some reason.

Further options and refinements will now be described with reference to FIG. 4 to FIG. 16.

In some embodiments, transmission of delta user data by the ground server 3 and its reception by the onboard server 2 is performed in a push manner, e.g. without any solicitation by the onboard server 2. For example, when the ground server 3 determines a change of a user data record maintained by the ground server 3 and which is known to the ground server 3 to be present on the onboard server 2, the ground server 3 transmits the changed user data record to the onboard server 2 without a previous request to transmit the user data record from the onboard server 2. For example, the ground server 3 may receive an indication from a Departure Control System indicating that a particular flight is delayed. The ground server 3 verifies whether the delayed flight is listed in the Passenger Name Records of the passengers aboard the airplane 1 as a connecting flight. If this is affirmative, the ground server 3 transmits the user data record of the delayed connecting flight to the onboard server 2 as delta user data. The onboard server 2 stores the user data record in its respective repository and forwards the user data record concerning the delayed flight to the onboard device 5, 6 of the respective passenger(s). This communication schema corresponds to the message sequence chart visualizes by FIG. 3, with the addition of an event/a notification to the ground server 3 side which triggers this delta user data push by the ground server 3 to the onboard server 2.

Figure 4:
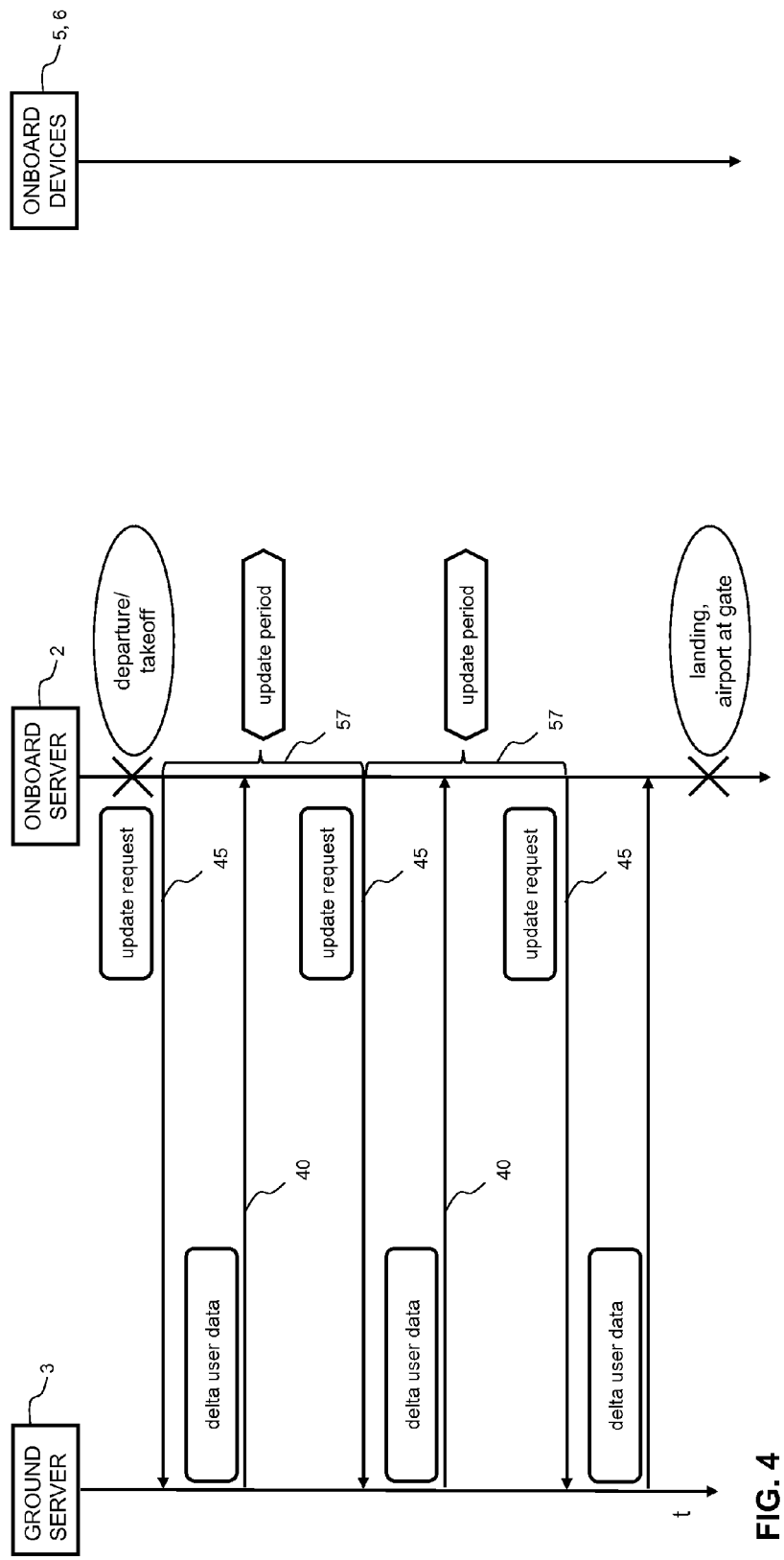
FIG. 4 relates to a periodic update during the flight.

In some embodiments, transmission of delta user data by the ground server 3 and its reception by the onboard server 2 is—in addition or as an alternative to the push transmission just described—triggered by an update request 45 issued by the onboard server 2 to the ground server 3 (FIGS. 4 to 7 visualizing the update process between the onboard server 2 and the ground server 3—note that the communication between the onboard server 2 and the onboard devices 5, 6 to distribute user data occurring in parallel is not shown for reasons of clarity). In general, the onboard server 2 issues an update request 45 in order to retrieve delta user data (and in some embodiments, also updated executable application code) from the ground server 3, i.e. the data is transmitted in a pull manner. The ground server 3 responds to an update request 45 with at least one delta user data message 40 (message 40 as shown by FIG. 4 represents one or more messages responding to update request 45 and transmitting all delta user data retrieved by update quest 45). The update request 45 may either request a general update of the user data present at the onboard server 2 or may indicate particular data records or portions of which an update is sought. Thus, the onboard server 2 is able to control the extent of updates by means of the update requests 45 and, for example, limit the delta data retrieved from the ground server 3 to particular types of data (e.g. only passenger or flight-related information, but not any multi-media content).

The update request 45 issued by the onboard server 2 may be triggered or prohibited by different criteria and conditions including a periodic update (FIG. 4), an update depending on a flight phase of the airplane (FIG. 5), an update depending on a geographical location of the airplane (FIG. 6), an update in response to determining an availability of the wireless interface after an unavailability period of the wireless interface (FIG. 7), a terminal update request by one of the seat entertainment terminals 5 or by one of the personal mobile terminals 6 (FIG. 8), or any combination thereof.

In some embodiments, the onboard server 2 periodically transmits an update request 45 to the ground server 3 and the ground server responds with respective delta user data messages 40 (FIG. 4). This scheme is, for example, sensible in situations in which the wireless interface 4 offers a suitable and constantly available bandwidth for general updates of the user data available at the onboard server 2 and, thus, the update requests 45 effect an update of all types of user data available at the onboard server 2 or at least of specific types of data such as travel-related and passenger-related data. The update period 57 utilized by the onboard server may be constant over a longer period of time, but the onboard server 2 is also arranged to adjust the update period 57 in some embodiments depending on various factors such as the number and requested content of content retrieval requests from the onboard devices 5, 6 or the amount of delta user data previously received from the ground server 3. For example, for a period of 30 minutes at the beginning of the flight, the onboard server 2 issues an update request 45 once a minute because of a significant number of content retrieval request relating to email traffic by some of the onboard devices 5, 6 over this time period. Then, the number of these email retrieval requests decreases and the onboard server 2 extends the update period 57 to an update request 45 only once every five minutes.

Figure 5:
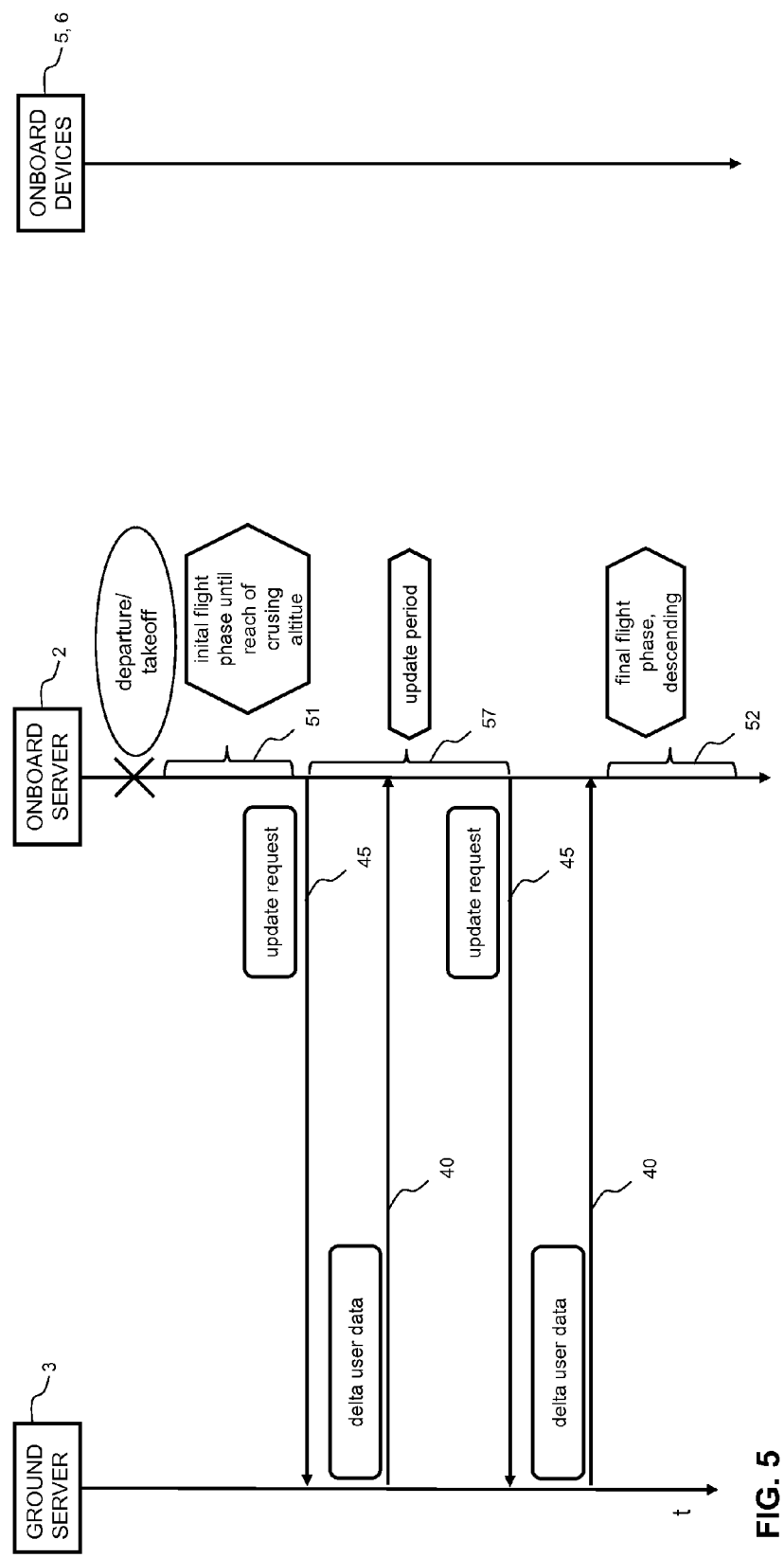
FIG. 5 relates to updates taking into account flight phases.

In some embodiments, the onboard server 2 issues update requests 45 depending on the flight phase of the airplane 1 (FIG. 5). For example, law or government regulation may prohibit ground communication by the onboard server 2 (and by the onboard devices 5, 6) during an initial flight phase 51 after take-off of the airplane 2 and/or during a final flight phase 52 while the airplane descends to the destination airport. These flight phases may be defined in dependency of the airplane's altitude. For example, the initial flight phase 51 may last until the airplane reaches an altitude of e.g. 3.000 meters (=9,842 ft) or, alternatively, reaches its cruising altitude. Accordingly, the final flight phase 52 may be entered when the airplane 1 drops below an altitude of e.g. 3.000 meters (=9,842 ft) or, alternatively, leaves its cruising altitude. A flight phase during which the onboard server 2 does not issue any update requests 45 to the ground server may also occur during the flight, for example, during a phase of turbulences. The definitions and conditions of flight phases are generally predetermined. Entry of a new flight phase may either be determined remote from the airplane 1 by ground operation/flight control and signaled to the airplane 1 and the onboard server 2. Alternatively, in some embodiments, entry of a new flight phase may also be determined onboard by the airplane's conditions. Accordingly, in some embodiments, the onboard server 2 is arranged in way that its ground communication functions via wireless interface 4 can be temporarily deactivated by a remote signal received from ground operation/flight control and/or onboard by the crew of the airplane 1. As shown by FIG. 5, conditions of issuing an update request 45 periodically and prohibiting issuance of update requests 45 may be combined so that the onboard server 2 does not transmit any update request 45 during the initial flight phase 51 and the final flight phase 52, but periodically transmits update requests during the main flight phase in between.

Figure 6:
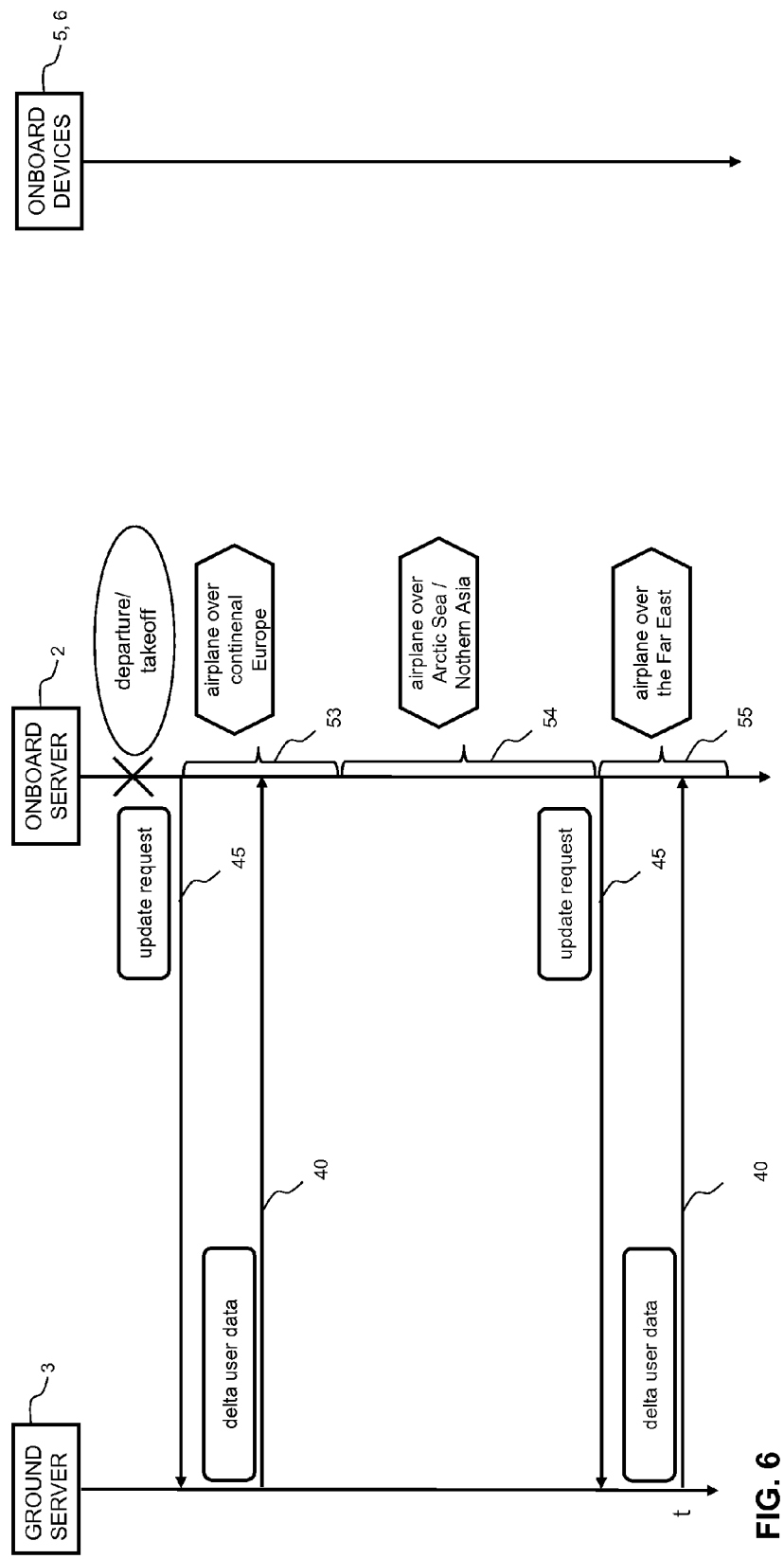
FIG. 6 relates to updates depending on the geographic location of the airplane during the flight.

In some embodiments, the onboard server 2 issues update requests 45 depending on the geographical location of the airplane (FIG. 6). For example, as shown by FIG. 6, the airplane's flight originates in Munich, Germany, and heads to Tokyo, Japan with a route via the Arctic Sea and/or the Northern Asian continent. The onboard server 2 may transmit update requests 45 as long as the airplane 1 is located over continental Europe (phase 53 in FIG. 6), but may be programmed to cease transmission of update requests while the airplane 1 is located over the Arctic Sea or Northern Siberia (phase 54 in FIG. 6), due to a pre-known lack of coverage of SatCom and mobile communication or the availability of only expensive SatCom connections. The onboard server 2 may then resume the transmission of update requests 45 once it enters the Far East region (phase 55 in FIG. 6). Again, this update request condition is combinable with other conditions such as the periodic update requests and the update requests depending on flight phases as previously described with reference to FIGS. 4 and 5.

Figure 7:
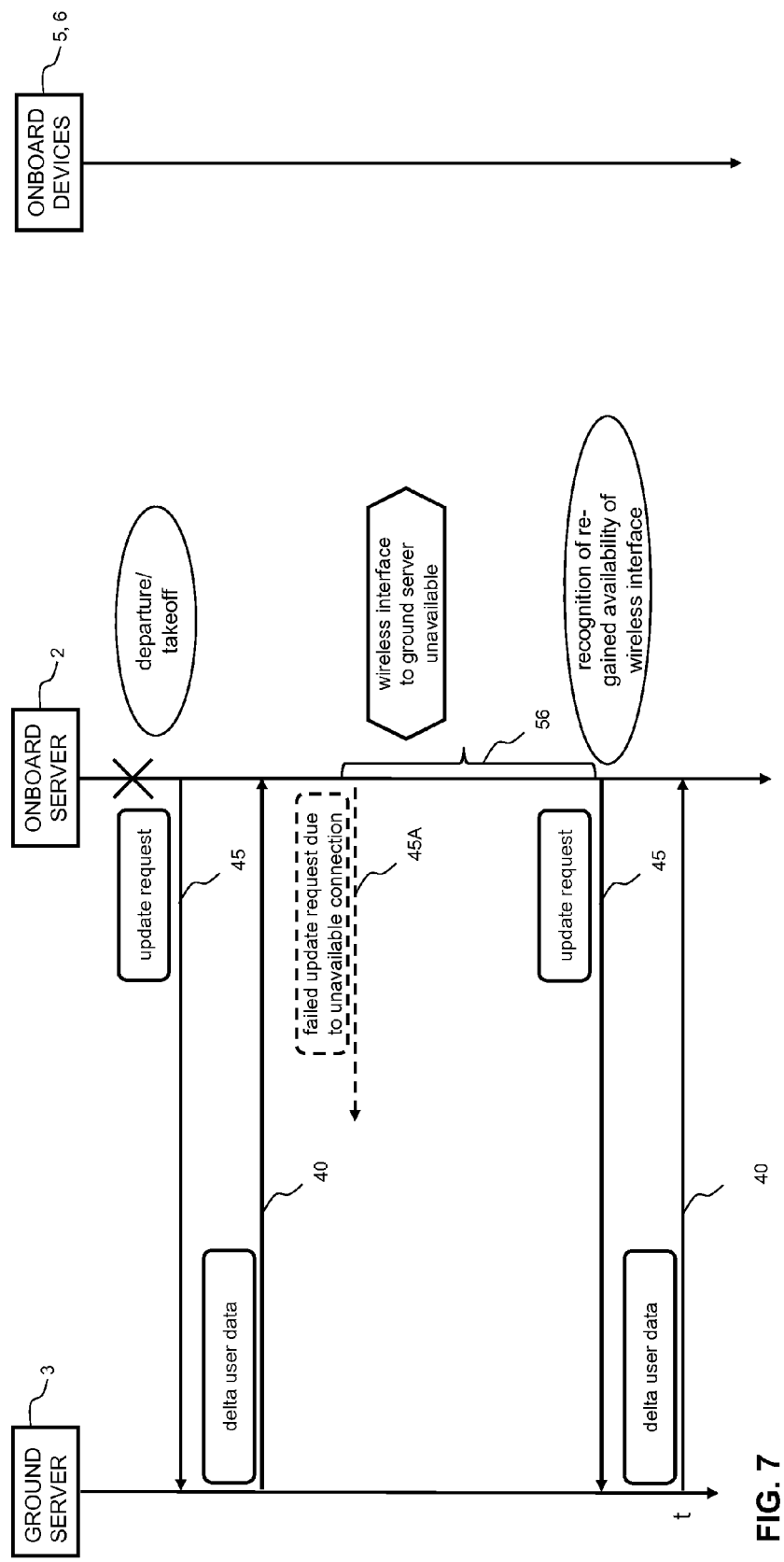
FIG. 7 relates to updates in response of determining a re-availability of the onboard server's wireless interface.

In some embodiments, the onboard server 2 issues an update request 45 in response to a determination that the wireless interface 4 has become available after having been unavailable for a certain period of time (FIG. 7). As will still be explained further below with reference to FIG. 9, the onboard server 2 may detect an unavailability of the wireless interface 4 in the (failed) attempt to transmit an update request 45 to the ground server 3 (the failed attempt denoted as 45A in FIG. 7), after a previous attempt to transmit an update request 45 to the ground server 3 was successful. In this event, the onboard server 2 logs the point of time of the unavailability detection. From this point on, the onboard server 2 may monitor the un-/availability of the wireless interface 4, e.g. by issuing short probe messages. Alternatively, in some embodiments, the availability status of the wireless interface 4 is monitored by the communication module 9 e.g. by using a lower layer protocol monitoring (e.g. directly at SatCom or 3G/4G/5G protocol layers), and the communication module 9 e.g. periodically transmits the wireless interface's availability status to the onboard server 2. When the monitoring of the wireless interface 4 shows a re-availability of the wireless interface 4, the onboard server 2 transmits an update request 45 to the ground server 3. This update request 45 sent at detected re-availability of the wireless interface 4 may either be a general update request 45 effecting the update of all sorts of user data maintained by the onboard server 2 or, e.g., a retransmission of the previous update request 45 that was not successfully transmitted due to the detected unavailability of the wireless interface 4. The onboard server 2 may be arranged to only issue such an update request 45 if the wireless interface 4 was unavailability for a certain minimum amount of time (phase 56 in FIG. 7) such as 5 minutes.

Figure 8:
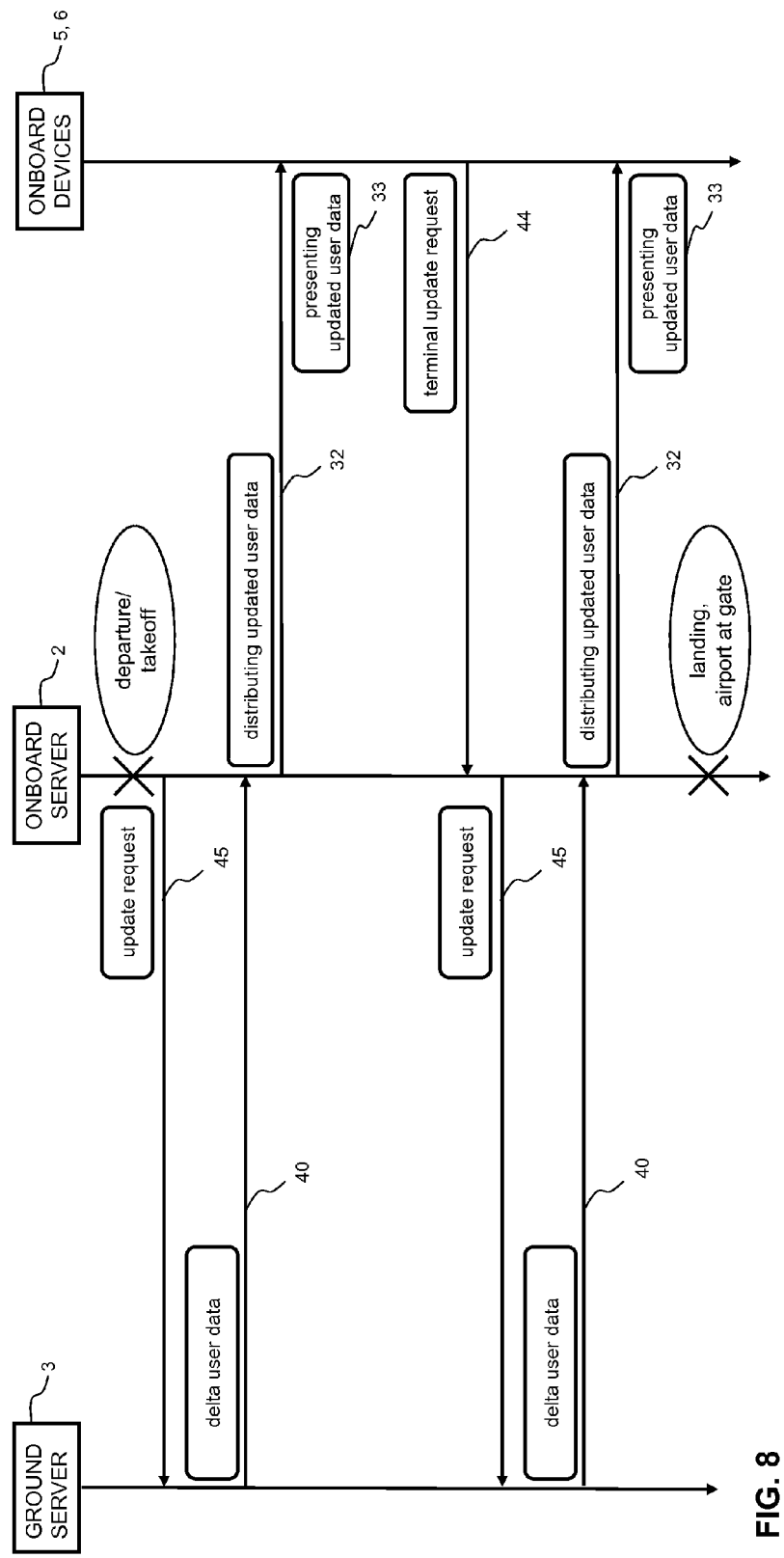
FIG. 8 visualizes onboard server update requests and terminal update requests.

In some embodiments, the onboard server 2 issues an update request 45 to the ground server 3 in response to a terminal update request 44 by one of the seat entertainment terminals 5 or by one of the personal mobile terminals 6 (FIG. 8). By using the terminal update request 44, an onboard device 5, 6 is able to request a ground server update via the onboard server 2. For example, a personal communication device 6 may retrieve new email messages from the POP3 or IMAP mail box of the user. To this end, the personal communication device 6 transmits a signal (e.g. and login message and a "RETR x" by which a client retrieves email x according to the POP3 protocol) which is interpreted by the onboard server as a terminal update request 44. In turn, the onboard server 2 may contact the corresponding POP3 server on the ground via the ground server 3 which is considered to be an update request 45 from the onboard server 2 to the ground server 3. The POP3 server then response with email x via the ground server 3 to the onboard server 2 (=delta user data message 40) which relays this by message 32 to the inquiring personal communication device 6 which presents this to the user (box 33).

Figure 9:
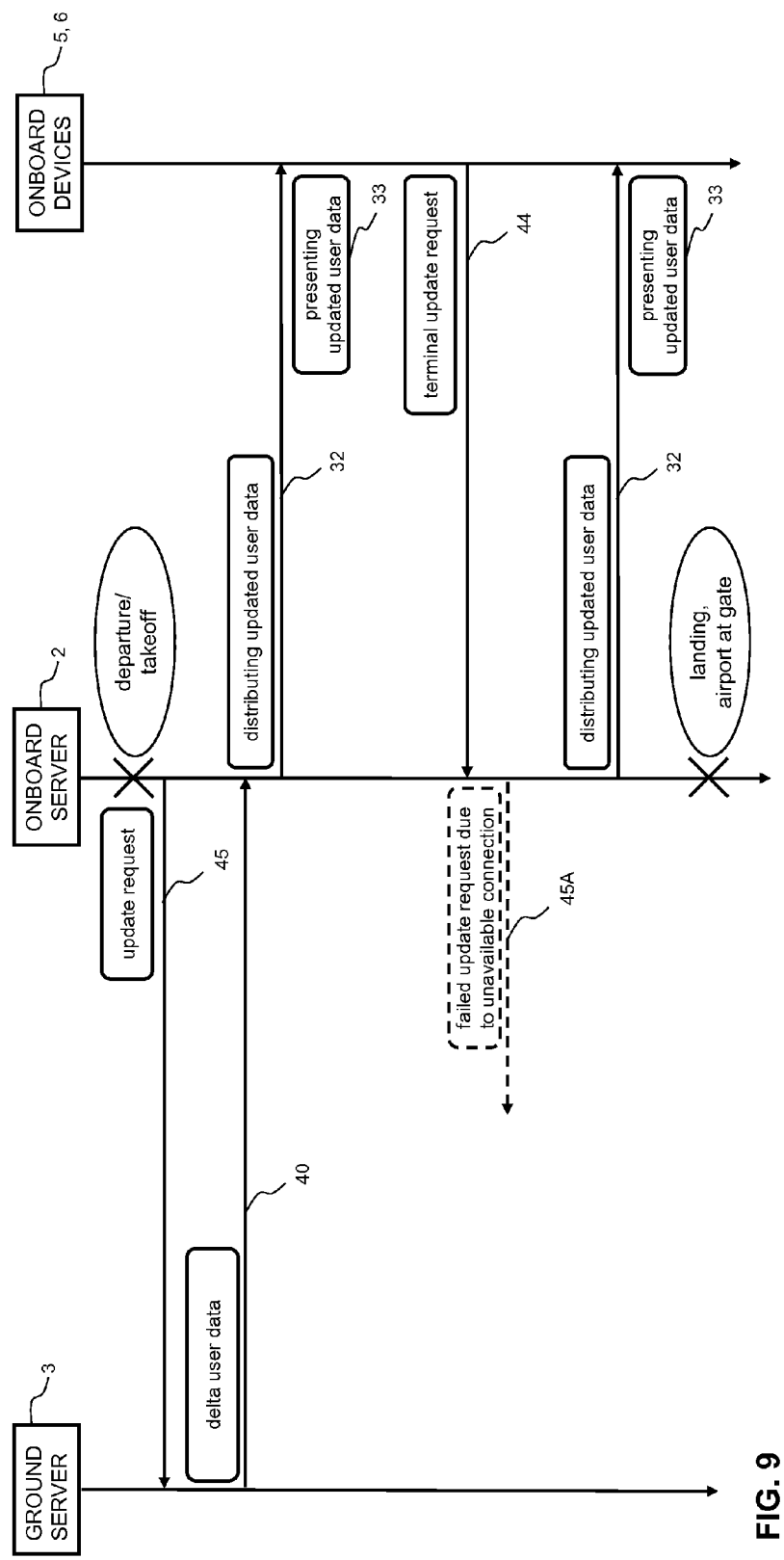
FIG. 9 shows continued distribution of current data by the onboard server despite an unavailability of the wireless interface to the ground server.

FIG. 9 depicts a situation highlighting the onboard server's capability to serve the onboard devices 5, 6 with the available user data despite an unavailability of the wireless interface 4 during the flight phase. The first part of FIG. 9 visualizes normal operation during the flight phase in which the onboard server 2 transmits an update request 45 to the ground server 3, the ground server 3 returns respective delta user data 40 to the onboard server 2 forming updated user data at the onboard server 2, and the onboard server 2 distributes the updated user data to the onboard devices 5, 6 (by message 32) which present the updated user data to the user (box 33). The update request 45 may be triggered by any of the conditions as described above with reference to FIGS. 4-8. Subsequently, one of the onboard devices 5, 6 transmits a terminal update request 44 to the onboard server 2 requesting user data that may or may not be available at the onboard server 2. The onboard server 2 processes the terminal update request 44 and determines whether or not the requested user data is already available at the onboard 2. In the case the requested user data is available, the onboard server 2 returns the user data to the requesting onboard device. Otherwise, the onboard server 2 initiates the transmission of an update request 45 to the ground server 3. In the attempt of transmitting the update request 45 to the ground server 3, the onboard server 2 determines an unavailability of the wireless interface 4 to the ground server 3, for example due to lack of coverage of the SatCom of 3G/4G/5G connection. In response to detecting this unavailability of the wireless interface 4, the onboard server 2 responds to the onboard device 5, 6 that sent the terminal update request 44 with default user data or surrogate user data already available at the onboard server 2 serving the onboard device's request as best as possible (message 32 in FIG. 9). This default user data or surrogate user data is formed by at least one element of the basic user data received by the onboard server 2 already during the ground phase (prior to take-off) and/or at least one element of updated user data formed by previously received delta user data during the flight phase (after take-off). For example, if the onboard device 5, 6 terminal update request 44 was directed to a retrieval of current weather data, the onboard server 2 responds with the last version of the weather data available, although this last version of the weather data may already be 30 minutes old, i.e. was received by the onboard server 2 from the ground server 3 30 minutes ago. The onboard server 2 may add an indication to the onboard device 5, 6 that the response data is not a current version, but represents only surrogate user data. Together with the surrogate data, onboard device 5, 6 may present this indication to the user (second box 33 in FIG. 9). If no meaningful default data or surrogate data is available at the onboard server 2, the onboard server 2 may also respond to onboard device 5, 6 with an error message indicating the unavailability of the wireless interface 4. The onboard device may then present this indication to the user.

Figure 10:
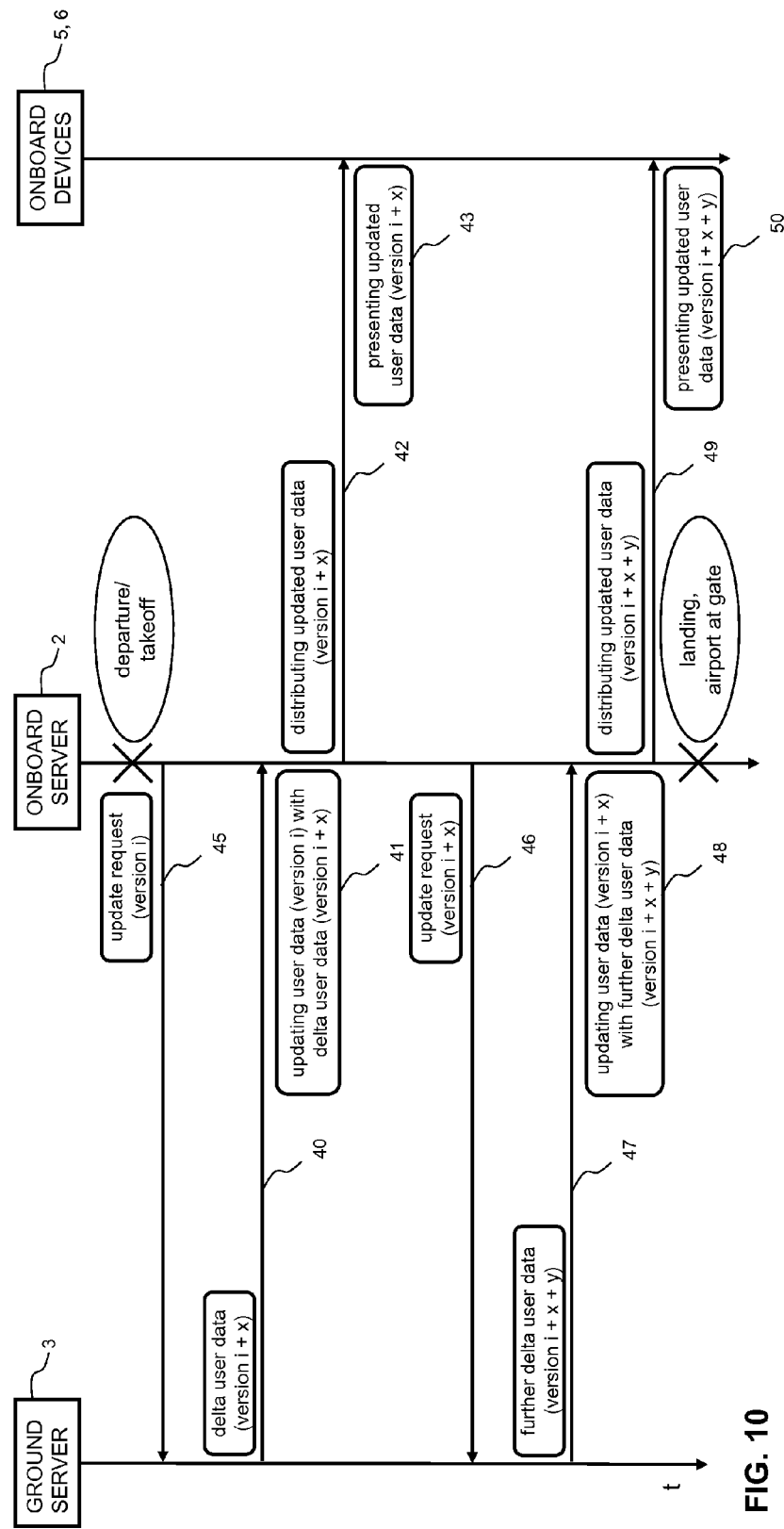
FIG. 10 shows the data update on the basis of versions and corresponding version identifiers.

In some embodiments, the communication between onboard server 2 and ground server 3 as well as between onboard server 2 and onboard devices 5, 6 utilizes a versioning scheme in order to implement the transmission of delta user data and avoid re-transmissions of user data already available at the onboard server (FIG. 10). To this end, the ground server 3 (and, if present, other servers connected to the ground server 3 and hosting user data) is arranged to maintain versions of user data and a respective history, each version of user data being associated with a version identifier. The delta user data transmitted from the ground server 3 to the onboard server 2 includes a respective version identifier identifying the version of the transmitted delta user data. By using the version identifiers included in the delta user data messages 40, also the onboard server maintains versions of updated user data, each version being associated with the correct version identifier. An update request 45 transmitted from the onboard server 2 to the ground server 3 also includes the correct version identifier indicating the version of the corresponding user data currently available at the onboard server, e.g. the updated user data formed by previously received delta user data 40. On the basis of the version identifier included in the update request 45, the ground server 3 compares the version of the updated user data being current available at the onboard server 2 with the version of the user data being currently available at the ground server 3 and determines the difference data representing the difference between both versions. The ground server 3 then only transmits the differences between the updated user data available at the onboard server 2 and the current version of the user data being available at the ground server 3, the respective delta user message 40 again including the version identifier indicating the current user data version of the ground server 3. In the case that the user data version indicated by the onboard server 3 is still valid, i.e. unchanged, at the ground server 3, the delta user data response 40 of the ground server is empty as the difference is zero.

An example is given by FIG. 10. During the flight phase, the onboard server 2 sends an update request 45 including a version identifier indicating version i to the ground server 3. The ground server determines the difference between the onboard server's user data version i and its own version of the corresponding user data. Assuming that there are differences, the ground server 3 includes the difference user data as delta user data in the response 40, together with the corresponding version identifier i+x. The onboard server 3 updates its corresponding user data from version i to version i+x (box 41) and is able to distribute the updated user data to the onboard devices 5, 6 (message 42) which, in turn, will present it to the users (box 43). Later on, the onboard server transmits the next update request 46 seeking to again update the user data. The update request 46 indicates the user data version by version identifier set to i+x. Again, the ground server 3 performs a comparison between the user data version indicated by the onboard server (i+x) and its own current version of the user data. The determined difference data is included in the ground server's delta user data response 47, together with the new version identifier set to i+x+y. Again, the onboard server 3 updates its corresponding user data from version i+x to version i+x+y (box 48) and is able to distribute the updated user data to the onboard devices 5, 6 (message 49) which, in turn, will present it to the users (box 50).

Moreover, the onboard server 2 may also be allowed to refrain from including a version identifier in its update requests 45. This is interpreted by the ground server 3 as a non-differential update request, i.e. the ground server 3 transmits all user data requested by the onboard server 2 without performing the differential comparison as described before.

Figure 11A:
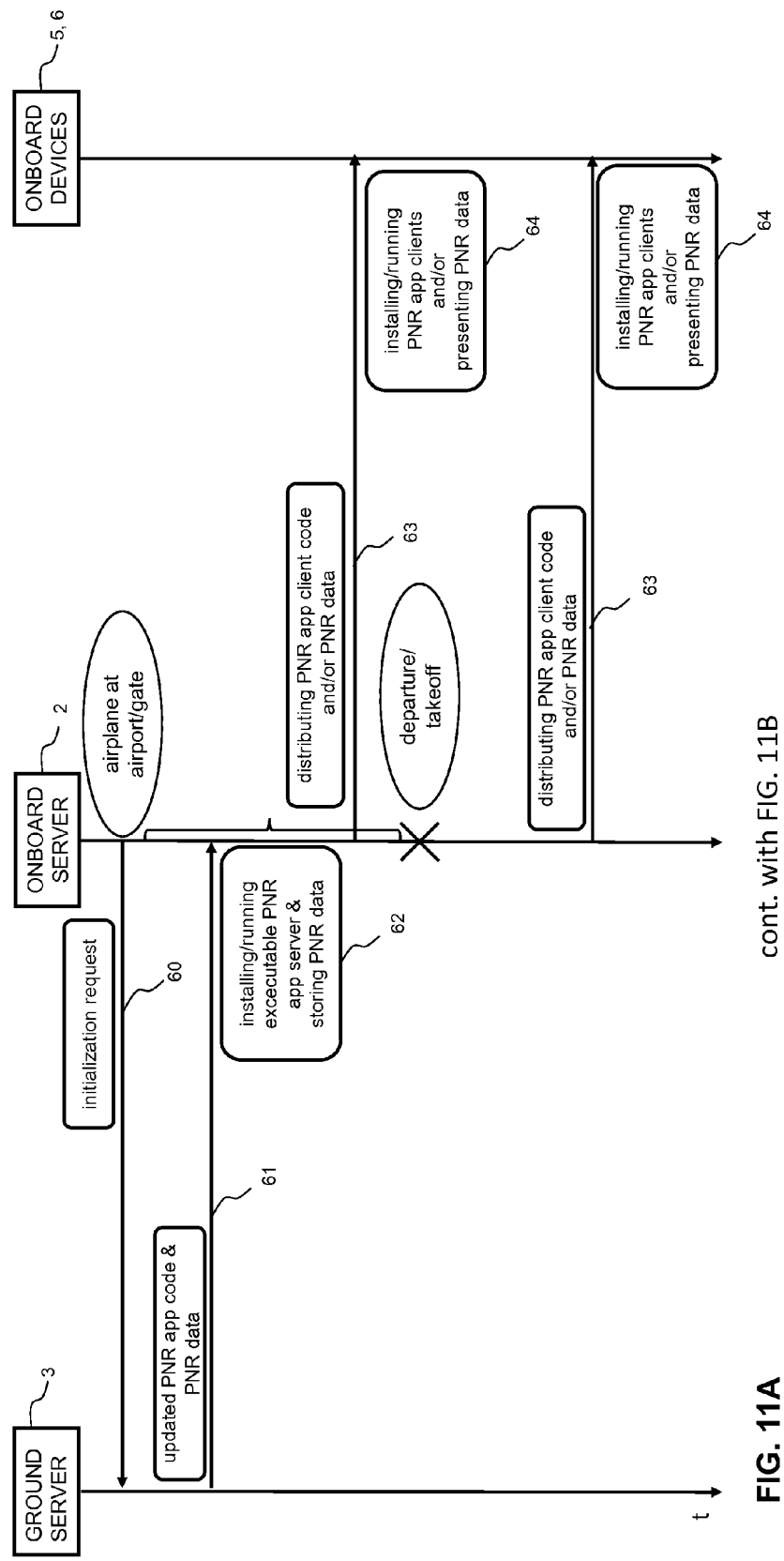

FIGS. 11A and 11B relate to an example of the communication of travel-related and passenger-related information. As mentioned by FIGS. 11A and 11B, this information includes e.g. Passenger Name Records (PNR) of passengers aboard the airplane 1 which are provided by a PNR database hosted at the ground server 3 and distributed to the onboard devices 5, 6 by a PNR server application running on the onboard server 2. FIGS. 11A and 11B cover both, the information exchange scheme during the ground phase and during the flight phase.

In the ground phase, while the airplane 1 is located at the gate of the origin airport (or at an earlier point of time while the airplane 1 is located on the ground), the onboard server 2 is initialized with the executable code implementing PNR server application (if necessary), or e.g. an update to the PNR server application already existing at the onboard server 3, executable code implementing a PNR client application (if necessary), or e.g. an update to the PNR client application already stored at the onboard server 3, any other executable application code needed at the onboard server 3, as well as all currently available PNR data of the passengers supposed to board the aircraft. The initialization is triggered by an initialization request 60 sent from the onboard server 3 to the ground server 2. The initialization request 60 includes a flight identifier enabling the ground server 3 compile the PNR data of all passenger booked for the flight conducted by the airplane 1. The ground server 3 returns the respective PNR application code and PNR data to the onboard server with one or more messages 61. As shown by box 62, the onboard server 2 installs or updates its PNR server application stores the received PNR data (e.g. in a logical portion of memory 16 referred to as executed server applications 19, see FIG. 16) and stores the PNR client application code (e.g. in application storage 21, see FIG. 16). Still during the ground phase and during the flight phase also after take-off, the onboard server 2 sends PNR client application code to requesting onboard devices 5, 6 for installation and executing of the PNR client application requested PNR data as well as PNR data to requesting onboard devices 5, 6 (FIG. 11B, messages 63, representing any requests of onboard devices 5, 6 and PNR code and PNR data messages by onboard server 3). The distribution PNR user data may be realized by the PNR server application executed at the onboard server, while the distribution of the PNR client code may be realized by an AppStore application executed at the onboard server 3. The onboard devices install and run the PNR client application and, by using the executed PNR client application, retrieve PNR data from the PNR server application running at the onboard server 2 and present the retrieved PNR data to the user (FIG. 11A, boxes 64).

Now turning to updates of the PNR data during the flight phase (FIG. 11B), the onboard server 2 transmits update requests 66, 71 to the ground server 3 in order to retrieve delta PNR data from the ground server 3 (messages 67, 72). Similar to the initialization request 60, also the update requests 66, 71 include the flight identifier identifying the current flight operated by the airplane 1. In addition, the update requests 66, 71 include the respective version identifier indicating the current version of the PNR data stored by the onboard server 3, on the basis of which the ground server 3 performs a comparison of the current PNR data in its PNR database with the version of the PNR data indicated by the version identifier of the onboard server 2. In accordance with the embodiment of FIG. 10 described above, the messages 67, 72 carrying the delta PNR data include the updated version identifier indicating the current version of the delta PNR data returned by the ground server 3. After having received the delta PNR data, the onboard server updates the PNR data stored by the PNR server application (boxes 68 and 73), thereby forming updated PNR data, distributes the updated PNR to the requesting onboard devices 5, 6 (messages 69 and 74) which present the updated PNR data to the passenger (boxes 70 and 75).

In a similar or analogous way, executable application code and user data related to other server applications and client applications may be provided to the onboard server 2 and the onboard devices 5, 6, including social network services such as Facebook and Twitter, Internet browsing, email synchronization, synchronizing business data, e.g. a salesman preparing a business document with his laptop and uploading the document to his company server or to a cloud, etc.

Figure 12:
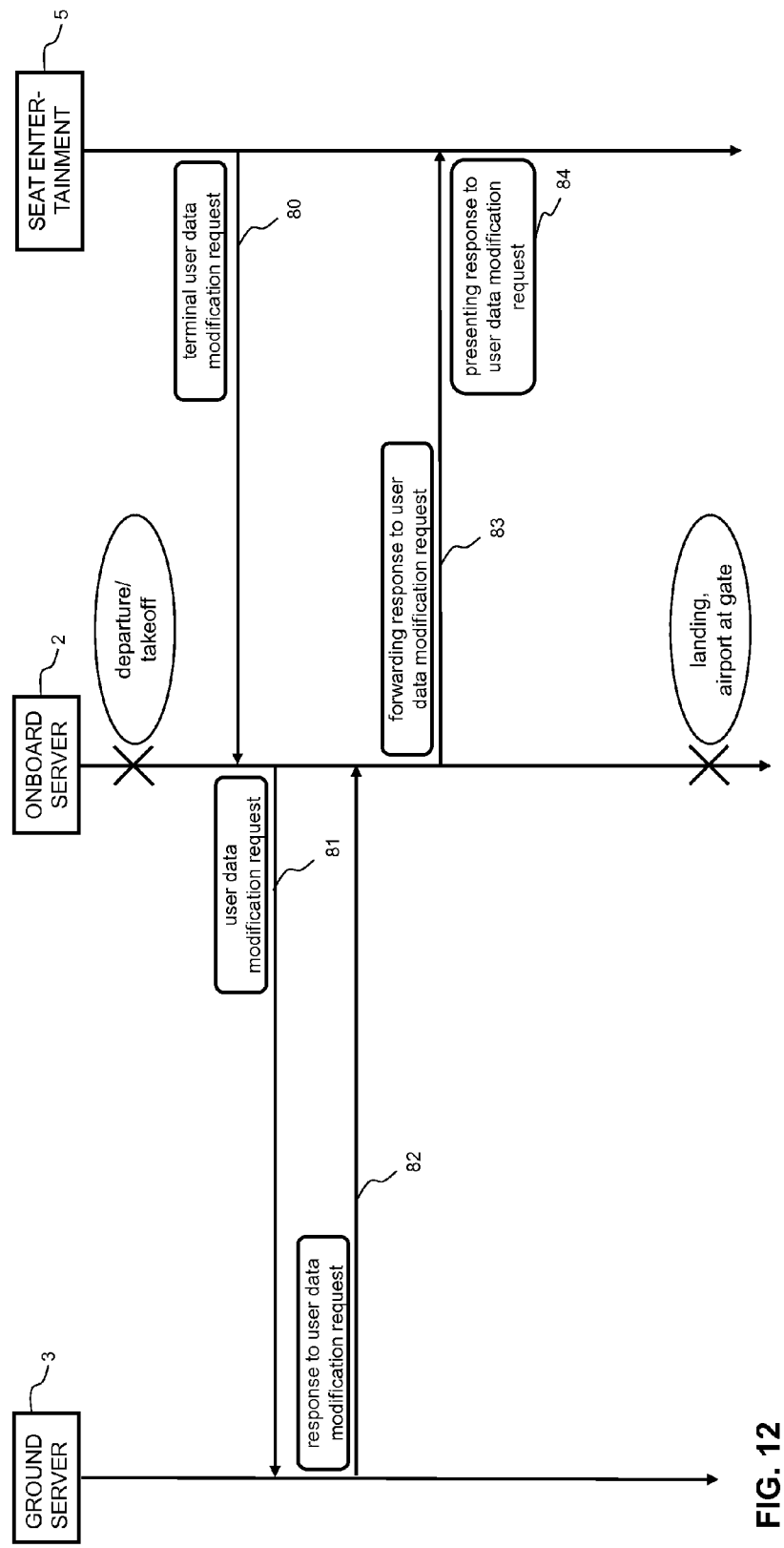
FIG. 12 introduces the user data modification effected by an onboard terminal.
Figure 13:
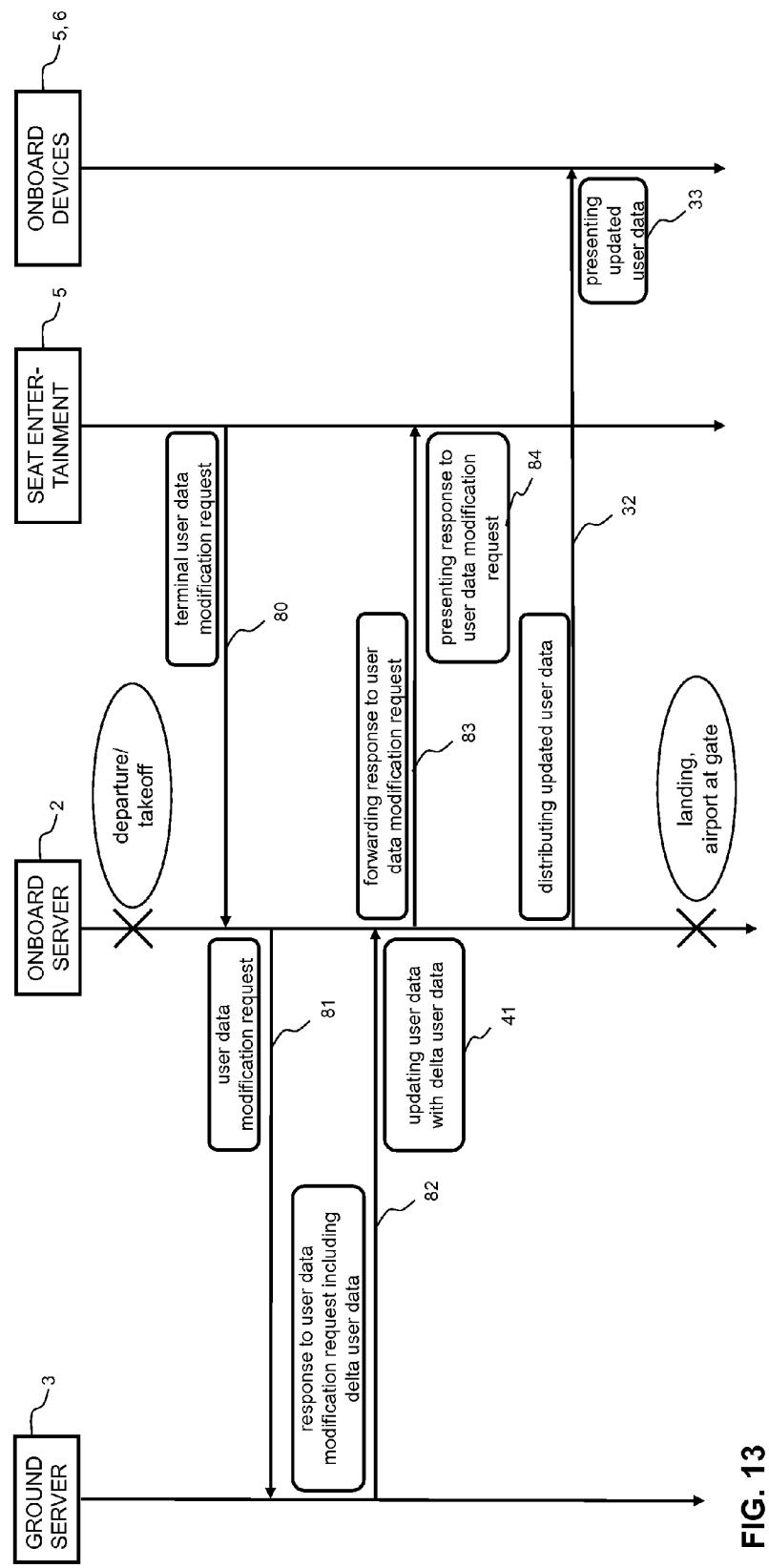
FIG. 13 visualizes embedding delta user data into a response to a user data modification.

In some embodiments, the communication scheme between the onboard server 2 and the ground server 3 as well as between onboard server 2 and onboard devices 5, 6 additionally allows for a modification of ground user data stored at or managed by the ground server 3 during the flight (FIGS. 12 & 13). More specifically, the onboard devices 5, 6 (FIGS. 12 and 13 exemplary refer to an individual seat entertainment terminal 5, but the following functionalities also apply to personal communication devices 6) are arranged to transmit a terminal user data modification request 80 to the onboard server 2 by which the onboard device 5, 6 requests to modify at least one element of the user data stored at the ground server 3 (or another server being remote from the airplane connected to the ground server 3). For example, the passenger utilizing the seat entertainment terminal 5 may have rebooked his/her accommodation at the travel destination and may wish to update his/her itinerary in the PNR database of the ground server 3 accordingly. In response to receipt of the terminal user data modification request, the onboard server 3 transmits a respective user data modification request 81 to the ground server 3. The ground server 3, after having received the request 81, effects the changes of the ground user data and acknowledges this to the onboard server by response 82. The onboard server 2 forwards the response by message 83 and the seat entertainment terminal 5 is able to indicate the successful ground user data modification to the user (box 84).

Similar to the situation of an unavailable wireless interface 4 as described above with reference to FIG. 9, the onboard server 3 may also determine an unavailability of the wireless interface 4 in the attempt of transmitting the user data modification request 81 to the ground server 3. In this case, the onboard server 2, in some embodiments, is arranged to buffer the terminal user data modification request 80 until the availability of the wireless interface 4 is regained and transmit the user data modification request 81 at a later point of time. Thus, the onboard devices 5, 6 are relieved from caring about a successful transmission of the terminal user data modification requests 80 to the ground server 3.

In some embodiments, the response 82 to a user data modification request is used to return delta user data to the onboard server without an explicit update request 45 by the onboard server 2 (FIG. 13). This is, for example, useful in situations in which the ground server 3 has delta user data available that may or may not relate to the user data modified by the user data modification request 81. Continuing the above example of the passenger having rebooked his/her accommodation, in the course of modifying the passenger's accommodation data in the PNR database, the ground server 3 may examine whether and positively determine that the connecting flight of the same passenger (and potentially other connecting flights relevant for other passengers) has changed since the last update of the onboard server's user data and, thus, includes the respective current flight information in the response 82 to the user data modification request (FIG. 13). The onboard server 2 receiving the response 82 then updates its user data in the same manner as described above (box 41 in FIG. 13), forwards the response to the user data modification request including the updated connecting flight information of the passenger having effected the terminal user data modification request 80, and potentially also distributes any other user data that was updated by the reception of the delta data included in the response 82 to the same and/or any other onboard devices 5, 6 (message 32) which present this updated user data to the user (box 33). In this way, response messages 82 are efficiently used to return more current user data to the onboard server without explicit update requests 45.

In the following, a few more specific implementation examples of the messages exchanges between the onboard server 2 and the ground server 3 to realize the airplane-to-ground communication scheme described above such as initialization message 30 and the update request 45 transmitted from the onboard server 2 to the ground server 3, and the respective responses 40, 62 carrying the delta user data and/or executable application code are described. In this example, these messages are implemented as webservice calls using XML and JSON syntax.

As explained above with reference to FIG. 2, the initialization message 30 represents any type of message exchange during the ground phase in order to transmit executable application code and user data from the ground server 3 to the onboard server 2. In the present implementation example, initialization message 30 includes two types of more specific messages, namely user data initialization messages and application code initialization messages. As regards the user data initialization message, it is referred to the exemplary syntax and message examples of a delta user message described further below as, in this example, the user data initialization messages are, in terms of their syntax, identical to the delta user data messages. Similar to the delta user messages described below, also the user data initialization messages are triggered by an update request 45.

The application code initialization messages are downloaded by the onboard server 2 in a two-stage manner. At the first stage, the onboard server 2 contacts the ground server 3 by transmitting a request for an application manifest to the ground server 3. In this example, this request is transmitted by using an HTTP GET request to a URL stored at the onboard server. This requests includes the flight number of the next flight of the airplane 1 as a parameter. In response to this application manifest request, the ground server 3 replies with a manifest file which includes a list of all the components of the executable application code (e.g. application clients, server applications, update files, static configuration file for configuration of the onboard server, etc.) to be transferred from the ground server 3 to the onboard server 2, along with respective URL addresses from which the onboard server 2 can download the components of the executable application code. The manifest file may also indicate the target usage of the components of the executable application code within the airplane plane 1 (for example: to be executed at the onboard devices 5, 6, to be executed at the onboard server 2, to be stored as static configuration or resource files, etc.). The onboard server 2 processes the manifest file and then retrieves each component of the executable application code by issuing respective HTTP GET requests including the associated URL to the ground server 3. Note that the executable application code may be located at a web server component of the ground server 3 or another web server remote from the ground server 3.

An exemplary manifest file listing the URL regarding the executable application code, wherein the URLs of the static files (e.g. new configuration files) and the URL of the executable resource files are listed in separate URL lists, reads:

```
{
model: {
zipURLList: [
"/static_files.zip"
],
resURLList: [
"/apfplus/resources?module=at_award&LANGUAGE=CN&SITE=XDEFXDEF",
"/apfplus/resources?module=at_award&LANGUAGE=DE&SITE=XDEFXDEF"
]
}
}
```

An exemplary XML-based and JSON-based syntax of an update request 45 is described in the following. In this example, the request message serves the purpose of retrieving travel-related and flight-related data as described before and, to this end, may contain three parameters (beyond the outer XML element identifying the message as an onboardDataRequest). The flightId is, in this example, a mandatory parameter having the function of identifying the flight of the requesting onboard server 2. The parameter previousRevision indicates to the latest version of the travel-related and flight-related data currently available at the onboard server 2. This parameter is also defined to be mandatory, but may carry an empty value in the case that no previous version of the travel-related and flight-related data has been received by the onboard server (e.g. in the case of an initialization retrieval triggered user data initialization messages as described above or after a loss of data due to a failure of the onboard server 2 or if a full retrieval as opposed to a differential update is requested for any other reasons). The third parameter called forceUpdate is used to indicate to the ground server 3 the particular data records currently available at the onboard server 2 and/or an onboard device 5, 6 should be updated, e.g. in the case the passenger or client is aware that the data currently available at the airplane may be out-of-date. This parameter is optional and only needs to present if one or more such data record(s) to be updated are to be indicated to the ground server 3. Thus, the resulting exemplary syntax of the update request message looks as follows:

```
<?xml version="1.0" encoding="UTF-8"?>
<onboardDataRequest>
    <flightId> FLIGHT ID </flightId> (MANDATORY)
    <previousRevision> NUMBER OF THE LAST RECEIVED
REVISION (POSSIBLY EMPTY) </previousRevision> (MANDATORY)
    <forceUpdate type="TYPE OF ENTITY TO UPDATE" id=" ID OF
THE ENTITY TO UPDATE" /> (OPTIONAL)
</onboardDataRequest>
```

A specific update request example using this syntax not requesting a particular data record to be updated may be as follows:

```
<?xml version="1.0" encoding="UTF-8"?>
<onboardDataRequest>
<flightId>PRD_BA_175_LHR_2014-09-10</flightId>
<previousRevision>1416325741.624919</previousRevision>
</onboardDataRequest>
```

A specific update request example using this syntax requesting one or more particular data record(s) (here: a particular passenger name record, two passenger data records and a flight record) to be updated may be as follows:

```
<?xml version="1.0" encoding="UTF-8"?>
<onboardDataRequest>
<flightId>PRD_BA_175_LHR_2014-09-10</flightId>
<previousRevision>1416325741.624919</previousRevision>
<forceUpdate type="pnr" id="3GBFJG" />
<forceUpdate type="customer" id="2416255A00005590" />
<forceUpdate type="customer" id="2416255A00005647" />
<forceUpdate type="flight" id="PRD_BA_175_LHR_2014-09-10" />
</onboardDataRequest>
```

Continuing this example, an exemplary syntax for the response to this generic request message carrying the travel-related and flight-related delta user data is now described. Basically, this response syntax example includes—beyond the outer XML element identifying the message as an onboardDataRespone—a heading section with information relating the response to the previous update request. To this end, the heading section includes the parameters flightID, revision and previousRevision. The latter one enables the onboard server 2 to incorporate the updated delta data received with the response into its repository of user data and to build a consistent new version of the user data. The parameter revision identifies the version of user data currently available at the ground server 3 and is used by the onboard server 2 to identify its current version of user data in subsequent update requests 45. Revision is an increasing float number which changes if and only if at least one item of the user data has changed in comparison with the version identified by the previous update request 45.

The main content of the response contains the delta user data. For example, the following syntax allows to transmit a list of all flights related to the passengers of the airplane 1 inside XML elements <entity type="flight">, a list of all passengers aboard the airplane inside XML elements <entity type="customer"> and a list of all passenger name records inside elements <entity type="pnr"> and a list of possible re-accommodations inside elements <entity type="reacc">. The items within the XML elements (customer, flight, PNR and reacc) as subsequently listed is a simplified example which is not exhaustive. The order of a content within a JSON object does not need to be guaranteed and may thus vary.

The resulting exemplary syntax of the update response message looks as follows:

```
<?xml version="1.0" encoding="UTF-8"?>
<onboardDataResponse>
<flightId> FLIGHT ID </flightId>
<revision> REVISION NUMBER </revision>
<previousRevision> PREVIOUS REVISION GIVEN (POSSIBLY
EMPTY) </previousRevision>
<entityGroup type="flights">
<entity type="flight" id="FLIGHT ID">
{"flightNumber": FLIGHT NUMBER,
"boardPoint": IATA CODE OF DEPARTURE AIRPORT,
"departureDate": DATE IN THE FORMAT yyyy-mm-dd,
"departureTime": DEPARTURE TIME IN THE FORMAT hh:mm:ss,
... FURTHER FLIGHT INFO HERE...} </entity>
... FURTHER FLIGHTS HERE ...
</entityGroup>
<entityGroup type="customers">
<entity type="customer" id="CUSTOMER ID">
{"uci": CUSTOMER UNIQUE ID (USED IN CM),
"seatNumber": SEAT NUMBER,
"lastName": LAST NAME,
"firstName": FIRST NAME,
"title": TITLE,
"fqtvNumber": FREQUENT TRAVELER NUMBER,
... FURTHER PASSENGER INFO HERE ...}
</entity>
... FURTHER PASSENGERS HERE ...
</entityGroup>
<entityGroup type="pnrs">
<entity type="pnr" id="PNR ID">
{"recordLocator": RECORD LOCATOR NUMBER,
"lastName": LASTNAME,
"phoneNumber": PHONE NUMBER AS SHOWN IN PNR,
... FURTHER PNR INFO HERE,...}
</entity>
... FURTHER PNRs HERE ...
</entityGroup>
<entityGroup type="reaccs">
<entity type="reacc" id="REACC ID">
{"type": TYPE OF THE ACTIVITY,
"prepaid": BOOLEAN,
... FURTHER REACCOMODATION INFO HERE ...}
</entity>
... FURTHER REACCS HERE ...
</entityGroup>
</onboardDataResponse>
```

To continue the specific example of the update request given above (first the request example given above without any forceUpdate elements), a particular update response example responding to the above request example is given now. As this request example indicated previous revision number, the ground server calculates the travel-related and flight-related data which differs compared to the previous and the current revision number and only returns the data records (the passengers, the flights, the PNR and the re-accommodations) that have been changed or added. Moreover, if a particular data record (i.e. a flight, a passenger, a PNR or a re-accommodation) has been deleted at the ground server since the last update indicated by the previousRevision parameter, then the update response will signal this by flagging the corresponding entity:
<entity type="customer" id="2416255A00005580" delete="true"/>

Thus, an exemplary update response message returning updated travel-related and flight-related user data from the ground server 3 to the onboard server 2 in response to the above update request example looks as follows:

```
<?xml version="1.0" encoding="UTF-8"?>
<onboardDataResponse>
<flightId>PRD_BA_175_LHR_2014-09-10</flightId>
<revision>1416325941.226919</revision>
<previousRevision>1416325741.624919</previousRevision>
<entityGroup type="flights">
<entity type="flight"
id="PRD_BA_175_LHR_2014-09-10">
{"airline": "BA",
"flightNumber": 175,
"boardPoint": "LHR",
"departureDate": "2014-09-10",
"departureTime": "09:30:00",
...}
</entity>
</entityGroup>
<entityGroup type="customers">
<entity type="customer" id="2416255A00005580" delete="true"/>
<entity type="customer" id="2416255A00005590">
{"uci": "2416255A00005590",
"seatNumber": "027B",
"lastName": "Dupont",
"firstName": "Alice",
"title": "Miss",
"fqtvNumber": "987654321E",
...}
</entity>
</entityGroup>
<entityGroup type="pnrs"/>
<entityGroup type="reaccs"/>
</onboardDataResponse>
```

If the previous update request 45 included one or more forceUpdate elements, the corresponding update response will be in the identical format as previously shown. It is possible that, even after a forced update on a PNR, it appears that its information remains unchanged. Therefore, in-that case, this PNR would not be returned in the response. In conclusion, a forced update on an entity does not guarantee its presence in the response.

Figure 14:
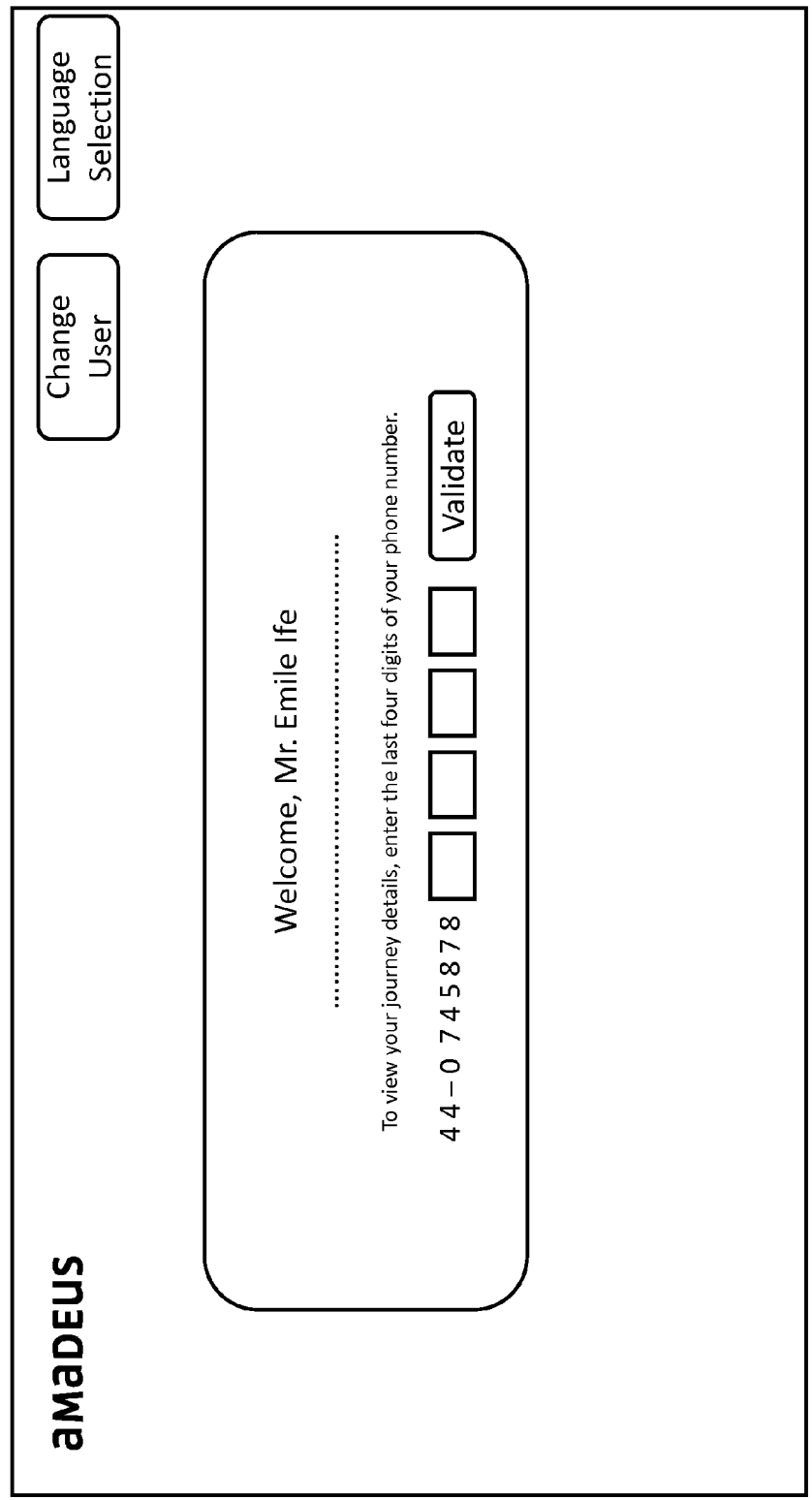
FIG. 14 and FIG. 15 show an exemplary graphical user interface of onboard applications.
Figure 15:
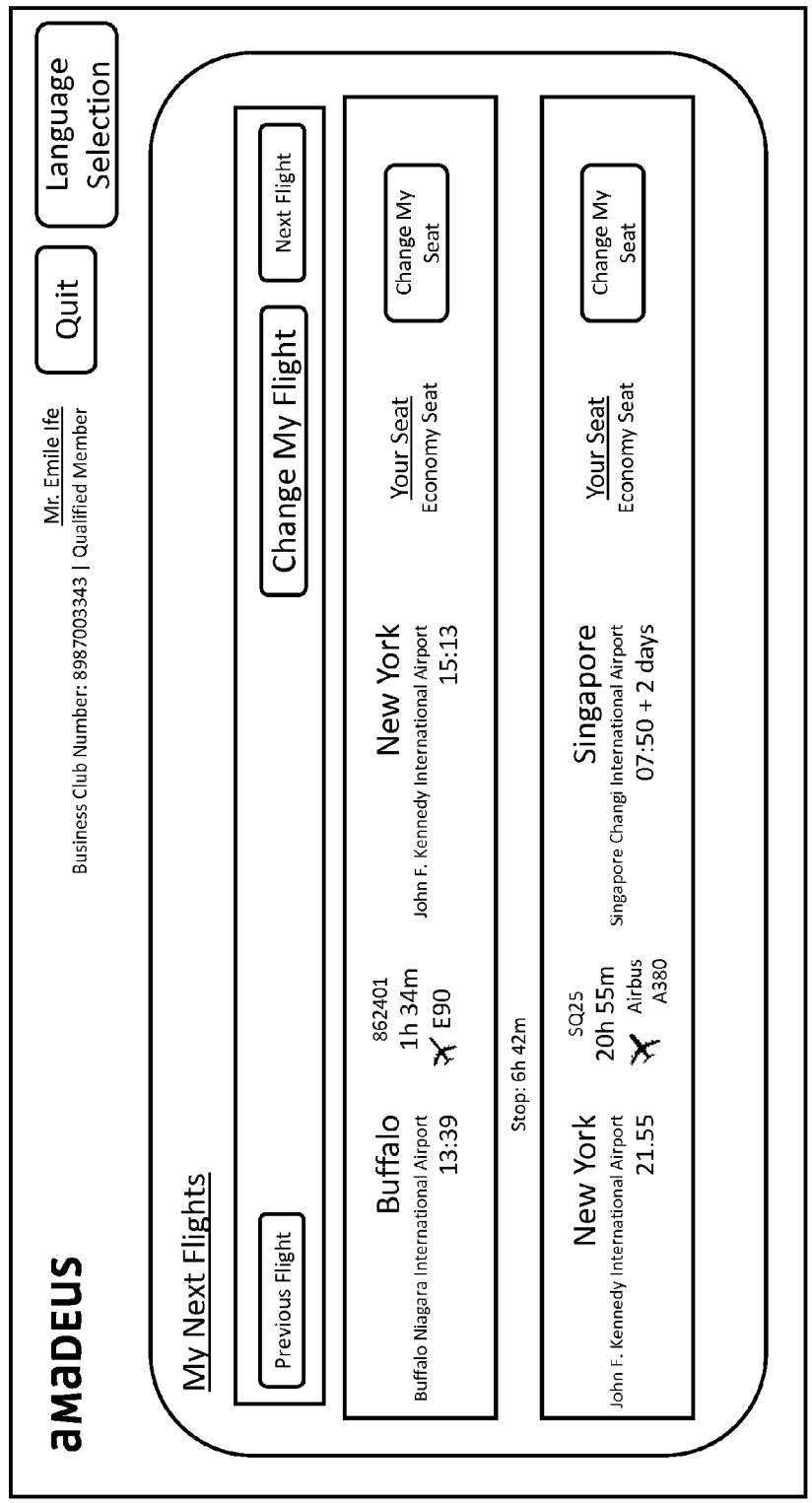

An exemplary login screen corresponding to the above implementation example is shown in by FIG. 14. In this example, the user is able to login to the PNR application by completing the input mask with the remaining digits of his/her cell phone. After successful login, the current travel details are presented to the user (FIG. 15) as they have been loaded to the onboard server 2 prior to take-off and potentially updated during the flight phase as described in detail above. As shown by FIG. 15, the user is also able to change connecting flights and/or seats during the flight phase (buttons "Change My Flight", "Change My Seat"), e.g. by utilizing the user data modification scheme as described above with reference to FIGS. 12 and 13.

In addition to the functionalities described above, the onboard server 2, in some embodiments, is programmed to perform further functionalities related to a secure communication and/or an efficient utilization of the wireless interface 4 during the flight phase, such as: protection by a firewall prohibiting outside infiltration, promoting fault tolerance e.g. by employing a RAID system (redundant array of independent disks), controlling and bundling a plurality of update requests 44 and terminal user data modification requests 80, e.g. by accumulating incoming requests 44, 80 for a given period of time and transmitting an aggregated update request 45 addressing all accumulated requests 44, 80 (as opposed to placing respective update requests 45 individually for every single terminal request 44, 80). This enhances the utilization of the wireless interface by reducing the number of messages to be exchanged between the onboard server 2 and the ground server 3 and, thus, reduces the corresponding overhead caused by each message transmission, promoting reliability of the communication by using ARQ mechanisms (Automatic Repeat Request); and/ or logging the network traffic within the local airplane network between the onboard server 2 and the onboard devices 5, 6 as well as the remote network traffic between the onboard server 2 and the ground server 3 in a log-file. This enables future analysis of the message exchange in order to further improve and fine-tune the communication scheme implemented by the onboard server 2.

Finally, FIG. 16 provides a block diagram illustrating the components of an onboard server 2. The exemplary server 2 includes at least one processor 11, a user interface 12, a network interface 14 for connection to the onboard devices 5, 6, a 3G/4G/5G/SatCom network interface 9, and a memory 16.

The at least one processor 11 includes at least one hardware-based microprocessor and accesses the memory 16. For interface with a user during both, the ground phase and the flight phase, the onboard server 2 includes a user interface 12 which incorporates one or more user input/output devices such as a keyboard, a pointing device, a display, a touchscreen display, etc.

Otherwise, data may be communicated to and from another computer or terminal over a network interface 114 coupled to the communication network 103.

The memory 16 may include the onboard server's random access memory (RAM) with the main operating storage (for executing operating system 17, user data update management 22 and executing server applications 19), as well as any supplemental levels of memory, e.g., cache memories, non-volatile or backup memories (e.g., programmable or flash memories), read-only memories, etc., and one or more mass storage devices such as internal hard disk storage devices, external hard disk storage devices, storage area network devices, etc.

The memory 16 of the onboard server 2 generally stores one or more repositories or databases including, for example, an entertainment content database 18, an application store 21, a seat entertainment database 20 and a user data repository 23. The databases 18, 20, 21, 23 may operate in accordance with given data structures and supporting data structures according to which the data stored in the databases 18, 20, 21, 23 is stored. In particular, the databases 18, 20, 21, 23 may be arranged with any database organization and/or structure including, but not limited to, a relational database, a hierarchical database, a network database, and/or combinations thereof. A database management system in the form of a computer software application executing as instructions on a processing unit of the onboard server 2 may be used to access the information or data stored in records of the data-bases in response to a query, where a query may be dynamically determined and executed by the operating system 17, the user data update management 22 and/or the executed server applications 19. For instance, the databases 18, 20, 21, 23 may be operated by using the Structured Query Language (SQL) or any variation thereof.

The onboard server 2 operates under the control of the operating system 17 and executes or otherwise relies upon various computer software applications (including the user data update management module 22 and the server applications 19), components, programs, objects, modules, engines, data structures, etc. In general, the user data update management module 19 and the executed server applications 19 are configured to interface with the databases/repositories 18, 20, 21, 23 to perform the functions of the onboard server 2 described in detail above.

Entertainment content database 18 includes the content intended to be streamed to the seat entertainment terminals 5 (and also, if adequate, to the personal communication devices 6), such as movies, music and pictures. Streaming this multimedia content may be realized by a multimedia server executed at the onboard server 2. The multimedia server as well as any other server applications are executed in a logical portion of memory 16, referred to by FIG. 16 as executed server applications 19. User data made available to the onboard devices 5, 6 by the various server applications is stored in user data repository 23. For example, a webserver may be executed in memory portion 19 which caches content of frequently demanded websites (=user data) to repository 23 for accessing these cached websites by the onboard devices 5, 6 during the flight phase. Furthermore, the onboard server 2 maintains a seat entertainment database 20 which includes management data of the seat entertainment devices 5, such as seat number, PNR of the passenger currently using the device 5, 6, IP addresses, MAC addresses, current status, capabilities etc. In addition, similar management data concerning the personal communication devices 6 registered in the local airplane network may be kept in the seat entertainment database 20. The application storage module 21 stores the client application code which can be retrieved, installed and executed by the onboard devices 5, 6 (in particular by the personal communication devices 6 which may not have installed the client software). The user data update management module 22 is reserved to execute the computer program instructions implementing the onboard server's communication and management functions to realize the communication scheme with the ground server 3 and the onboard devices 5, 6 as explained in detail above.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method for communicating over a wireless interface between an onboard server installed in an airplane and a ground server located remote from the airplane, the method comprising:

receiving, by the onboard server, first executable code for a server application, second executable code for a client application, and first user data from the ground server over the wireless interface before take-off of the airplane;

in response to the first executable code, the second executable code, and the first user data being received at the onboard server:

storing, by the onboard server, the first user data and the second executable code for the client application, and executing, by the onboard server, the first executable code for the server application to implement functions of the onboard server;

after the second executable code for the client application is stored, receiving, at the onboard server, a request for the second executable code for the client application from a seat entertainment terminal mounted within the airplane and/or from a personal mobile terminal of a user aboard the airplane;

in response to receiving the request, distributing, by the onboard server, the second executable code for the client application to the seat entertainment terminal for installation and execution at the seat entertainment terminal and/or to the personal mobile terminal of the user aboard the airplane for installation and execution at the personal mobile terminal;

after the second executable code for the client application is distributed, receiving, by the onboard server over the wireless interface, first delta user data from the ground server after the take-off and before landing of the airplane, the first delta user data updating the first user data to form second user data; and transmitting, by the onboard server and after the takeoff and before the landing of the airplane, at least a portion of the second user data to the seat entertainment terminal mounted within the airplane and/or to the personal mobile terminal of the user aboard the airplane for presentation to the user via the client application.

2. The method of claim 1 wherein receiving the first delta user data comprises:

issuing a first update request by the onboard server to the ground server to trigger the receipt of the first delta user data.

3. The method of claim 2 wherein the first update request is issued by the onboard server in a periodic manner, depending on a flight phase of the airplane, depending on a geographical location of the airplane, in response to determining that the wireless interface is available after an unavailability period of the wireless interface, or a combination thereof.

4. The method of claim 2 wherein issuing the first update request by the onboard server to the ground server comprises:

receiving, at the onboard server, a command sent from the seat entertainment terminal or the personal mobile terminal to the onboard server that triggers the first update request.

5. The method of claim 2 further comprising:

transmitting the first update request from the onboard server to the ground server after the takeoff and before the landing of the airplane; and in association with transmitting the first update request, determining, by the onboard server, an availability of the wireless interface to the ground server.

6. The method of claim 2 wherein the first delta user data includes a version identifier indicating a version of the first delta user data, and comprising:

issuing a second update request by the onboard server to the ground server to trigger the receipt of second delta user data, wherein the second update request includes the version identifier.

7. The method of claim 6 further comprising:

in response to issuing the second update request, receiving the second delta user data from the ground server at the onboard server, wherein the second delta user data represents differences between the second user data and third user data available at the ground server when the second update request is received.

8. The method of claim 2 wherein the first user data comprises flight-related data including passenger-name-record data of one or more passengers aboard the airplane, the first update request includes a flight identifier, and the first delta user data comprises updated passenger-name-record data of the one or more passengers including current information about connecting flights and/or accommodation of the one or more passengers.

9. The method of claim 1 further comprising, after the takeoff and before the landing of the airplane:

receiving, by the onboard server, a request from the seat entertainment terminal or the personal mobile terminal to modify at least one element of the first user data;

transmitting the request from the onboard server to the ground server; and receiving, by the onboard server, a response to the request from the ground server.

10. The method of claim 9 wherein the response includes the first delta user data.

11. The method of claim 1, wherein the request for the second executable code for the client application is received at the onboard server after the take-off and before the landing of the airplane during an unavailability period of the wireless interface.

12. An onboard server installed in an airplane and configured to communicate over a wireless interface with a ground server located remote from the airplane, the onboard server comprising:

one or more processors; and a memory coupled to the one or more processors, the memory including instructions that, when executed by the one or more processors, cause the onboard server to:

in response to receiving first executable code for a server application, second executable code for a client application, and first user data from the ground server over the wireless interface before take-off of the airplane:

store the first user data and the second executable code for the client application; and execute the first executable code for the server application to implement functions of the onboard server;

after the second executable code for the client application is stored, and in response to receiving a request for the second executable code for the client application from a seat entertainment terminal mounted within the airplane and/or from a personal mobile terminal of a user aboard the airplane:

distribute the second executable code for the client application to the seat entertainment terminal for installation and execution at the seat entertainment terminal and/or to the personal mobile terminal of the user aboard the airplane for installation and execution at the personal mobile terminal; and after the second executable code for the client application is distributed, in response to receiving first delta user data from the ground server over the wireless interface after the take-off and before landing of the airplane, the first delta user data updating the first user data to form second user data:

transmit at least a portion of the second user data to the seat entertainment terminal mounted within the airplane and/or to the personal mobile terminal of the user aboard the airplane for presentation to the user via the client application.

13. The onboard server of claim 12 wherein the instructions that, when executed by the one or more processors, cause the onboard server to receive the first delta user data comprises:

instructions that, when executed by the one or more processors, causes the onboard server to issue a first update request by the onboard server to the ground server to trigger the receipt of the first delta user data.

14. The onboard server of claim 13 wherein the first update request is issued by the onboard server in a periodic manner, depending on a flight phase of the airplane, depending on a geographical location of the airplane, in response to determining that the wireless interface is available after an unavailability period of the wireless interface, or a combination thereof.

15. The onboard server of claim 13 wherein the instructions that, when executed by the one or more processors, causes the onboard server to issue the first update request by the onboard server to the ground server comprises:
   instructions that, when executed by the one or more processors, causes the onboard server to receive a command sent from the seat entertainment terminal or the personal mobile terminal that triggers the first update request.

16. The onboard server of claim 13 further comprising:
   instructions that, when executed by the one or more processors, cause the onboard server to:
   transmit the first update request to the ground server after the takeoff and before the landing of the airplane; and
   in association with transmitting the first update request, determine an availability of the wireless interface to the ground server.

17. The onboard server of claim 13 wherein the first delta user data includes a version identifier indicating a version of the first delta user data, and further comprising instructions that, when executed by the one or more processors, cause the onboard server to:
   issue a second update request to the ground server to trigger the receipt of second delta user data,
   wherein the second update request includes the version identifier.

18. The onboard server of claim 17 further comprising instructions that, when executed by the one or more processors, cause the onboard server to:
   in response to issuing the second update request, receive the second delta user data from the ground server,
   wherein the second delta user data represents differences between the second user data and third user data available at the ground server when the second update request is received.

19. The onboard server of claim 13 wherein the first user data comprises flight-related data including passenger-name-record data of one or more passengers aboard the airplane, the first update request includes a flight identifier, and the first delta user data comprises updated passenger-name-record data of the one or more passengers including current information about connecting flights and/or accommodation of the one or more passengers.

20. The onboard server of claim 12 further comprising instructions that, when executed by the one or more processors, cause the onboard server to:
   after the takeoff and before the landing of the airplane:
      receive a request from the seat entertainment terminal or the personal mobile terminal to modify at least one element of the first user data;
      transmit the request to the ground server; and
      receive a response to the request from the ground server.

21. The onboard server of claim 20 wherein the response includes the first delta user data.

22. The onboard server of claim 12, wherein the request for the second executable code for the client application is received at the onboard server after the take-off and before the landing of the airplane during an unavailability period of the wireless interface.

23. A computer program product for an onboard server installed in an airplane and configured to communicate over a wireless interface with a ground server located remote from the airplane, the computer program product comprising:
   a non-transitory computer-readable storage medium; and
   program code stored on the non-transitory computer-readable storage medium that, when executed by one or more processors of the onboard server, causes the onboard server to:
   in response to receiving first executable code for a server application, second executable code for a client application, and first user data from the ground server over the wireless interface before take-off of the airplane:
      store the first user data and the second executable code for the client application; and
      execute the first executable code for the server application to implement functions of the onboard server;
   after the second executable code for the client application is stored, and in response to receiving a request for the second executable code for the client application from a seat entertainment terminal mounted within the airplane and/or from a personal mobile terminal of a user aboard the airplane:
      distribute the second executable code for the client application to the seat entertainment terminal for installation and execution at the seat entertainment terminal and/or to the personal mobile terminal of the user aboard the airplane for installation and execution at the personal mobile terminal; and
   after the second executable code for the client application is distributed, in response to receiving first delta user data from the ground server over the wireless interface after the take-off and before landing of the airplane, the first delta user data updating the first user data to form second user data:
      transmit at least a portion of the second user data to the seat entertainment terminal mounted within the airplane and/or to the personal mobile terminal of the user aboard the airplane for presentation to the user via the client application.

* * * * *